(12) United States Patent
Ushiyama

(10) Patent No.: US 8,311,976 B2
(45) Date of Patent: Nov. 13, 2012

(54) MANAGEMENT APPARATUS, RECORDING MEDIUM RECORDING AN INFORMATION GENERATION PROGRAM, AND INFORMATION GENERATING METHOD

(75) Inventor: Kentaro Ushiyama, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 154 days.

(21) Appl. No.: 12/659,794

(22) Filed: Mar. 22, 2010

(65) Prior Publication Data

US 2010/0281062 A1 Nov. 4, 2010

(30) Foreign Application Priority Data

May 1, 2009 (JP) ................................ 2009-112334

(51) Int. Cl.
*G06F 17/30* (2006.01)
(52) U.S. Cl. ........................................ 707/608; 711/216
(58) Field of Classification Search .................. 707/608; 711/216
See application file for complete search history.

(56) References Cited

U.S. PATENT DOCUMENTS

| | | | | |
|---|---|---|---|---|
| 5,530,757 A * | 6/1996 | Krawczyk | ...................... | 713/188 |
| 7,035,925 B1 * | 4/2006 | Nareddy et al. | .............. | 709/224 |
| 7,107,338 B1 * | 9/2006 | Nareddy et al. | .............. | 709/224 |
| 7,117,193 B1 * | 10/2006 | Basko et al. | .......................... | 1/1 |
| 7,464,122 B1 * | 12/2008 | Basko et al. | .......................... | 1/1 |
| 7,725,437 B2 * | 5/2010 | Kirshenbaum et al. | ....... | 707/640 |
| 7,797,310 B2 * | 9/2010 | Idicula et al. | ................. | 707/719 |
| 7,836,311 B2 * | 11/2010 | Kuriya et al. | ................. | 713/185 |
| 7,856,437 B2 * | 12/2010 | Kirshenbaum | ............... | 707/737 |
| 7,984,018 B2 * | 7/2011 | Rodriguez et al. | ............ | 707/625 |
| 2007/0283043 A1 | 12/2007 | Kiyohara et al. | | |
| 2009/0037445 A1 | 2/2009 | Ushiyama | | |

FOREIGN PATENT DOCUMENTS

JP A-2006-197400 7/2006
JP A-2007-280303 10/2007

* cited by examiner

*Primary Examiner* — Kim Nguyen
(74) *Attorney, Agent, or Firm* — Oliff & Berridge, PLC

(57) ABSTRACT

A management apparatus generates leaf page information including one or more records. The management apparatus generates root page information including falsification check information for checking falsification of child page information in position of a child of root page information or a record in position of a child of the root page information, and a serial number of the child page information in the position of the child of the root page information. The management apparatus also generates node page information including falsification check information for checking falsification of child page information in position of a child of node page information or a record in position of a child of the node page information positioned between the root page information and the leaf page information, and a serial number of the child page information in the position of the child of the node page information. The management apparatus stores the root page information, the node page information, and the leaf page information in the tree structure.

7 Claims, 16 Drawing Sheets

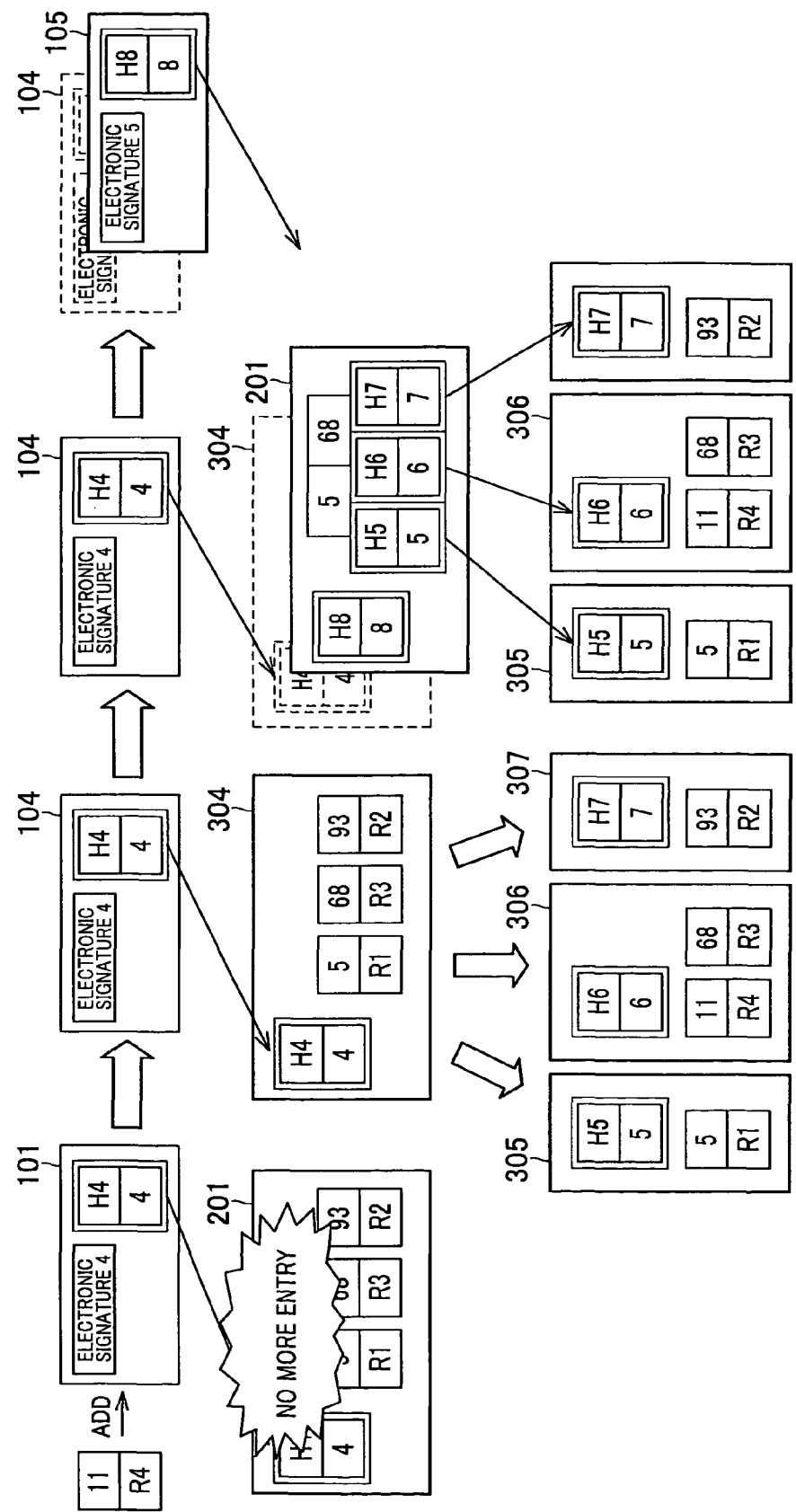

MANAGEMENT APPARATUS, RECORDING MEDIUM RECORDING AN INFORMATION GENERATION PROGRAM, AND INFORMATION GENERATING METHOD

The entire disclosure of the Japanese Patent Application No. 2009-112334, including the specification, the scope of claims, drawings, and abstract, filed on May 1, 2009 is incorporated herein by reference in its entirety.

BACKGROUND OF THE INVENTION

1. Field of the Invention

The present invention relates to a data structure for retrieving or managing desired content data. Concretely, the invention relates to a data structure and a retrieving technology capable of reliably preventing falsification of a record such as attribute information of content data.

2. Description of the Related Art

In a content distribution storage system of this kind, each node device uses content catalog information in which attribute information of content data is stated. Each node device retrieves desired content data and can obtain it from another node device or a content management server. The attribute information includes content name, publication start timing, publication end timing, search keyword for content data, and the like. The content catalog information is generated by a content management server and distributed to each node device. In the case where new content data is added or use of content data is finished in a content distribution storage system, the content catalog information is updated by the content management server and distributed to each of node devices.

SUMMARY OF THE INVENTION

When the number of pieces of content data which can be used in the content distribution storage system increases, the data amount of the content catalog information also increases. Consequently, there is a problem such that the content catalog information cannot be stored in a single node device.

In the case where each node device stores divided content catalog information, to prevent falsification of content catalog information, an electronic signature has to be given for each attribute information of each content data.

In the case of adding, updating, or deleting attribute information of content data to content catalog information, the content catalog information has to be retrieved. That is, it is necessary to retrieve the position of inserting or deleting the content catalog information to be added, updated, or deleted. Conventionally, desired content data is retrieved from almost entire list of content catalog information to which electronic signatures are given, so that the efficiency is low.

In view of the above problems and the like, an object of the present invention is, therefore, to provide a management apparatus for generating management information by which falsification of record such as attribute information of content data can be reliably prevented and efficient of retrieving management information such as content catalog information can be increased, a recording medium on which an information generation program is recorded, and an information generating method.

In order to solve the above problem, the invention according to claim 1 relates to a management apparatus comprising:

a page information storing device configured to store a plurality of pieces of page information as a tree structure so that the plurality of pieces of page information from root page information positioned in a root to leaf page information positioned in a leaf are associated with each other;

a leaf page information generating device configured to generate the leaf page information including one or more records;

a root page information generating device configured to generate the root page information including falsification check information for checking falsification of child page information in position of a child of the root page information or the record in position of a child of the root page information, and a serial number of the child page information in the position of the child of the root page information; and a node page information generating device configured to generate the node page information including falsification check information for checking falsification of child page information in position of a child of the node page information positioned between the root page information and the leaf page information or the record in position of a child of the node page information, and a serial number of the child page information in the position of the child of the node page information, wherein the page information storing device stores the root page information, the node page information, and the leaf page information in the tree structure.

BRIEF DESCRIPTION OF DRAWINGS

FIGS. 4A to 4D are diagrams showing an example of a state where the catalog information is updated in the case where a record is added.

DESCRIPTION OF THE PREFERRED EMBODIMENTS

Various embodiments of the present invention will be described below with reference to the drawings. The embodiments to be described below relate to the case of applying the present invention to a content distribution storage system.

1. Outline of Configuration and Operation of Content Distribution Storage System First, outline of the configuration and operation of a content distribution storage system according to an embodiment will be described with reference to FIG. 1 and the like.

Figure 1:
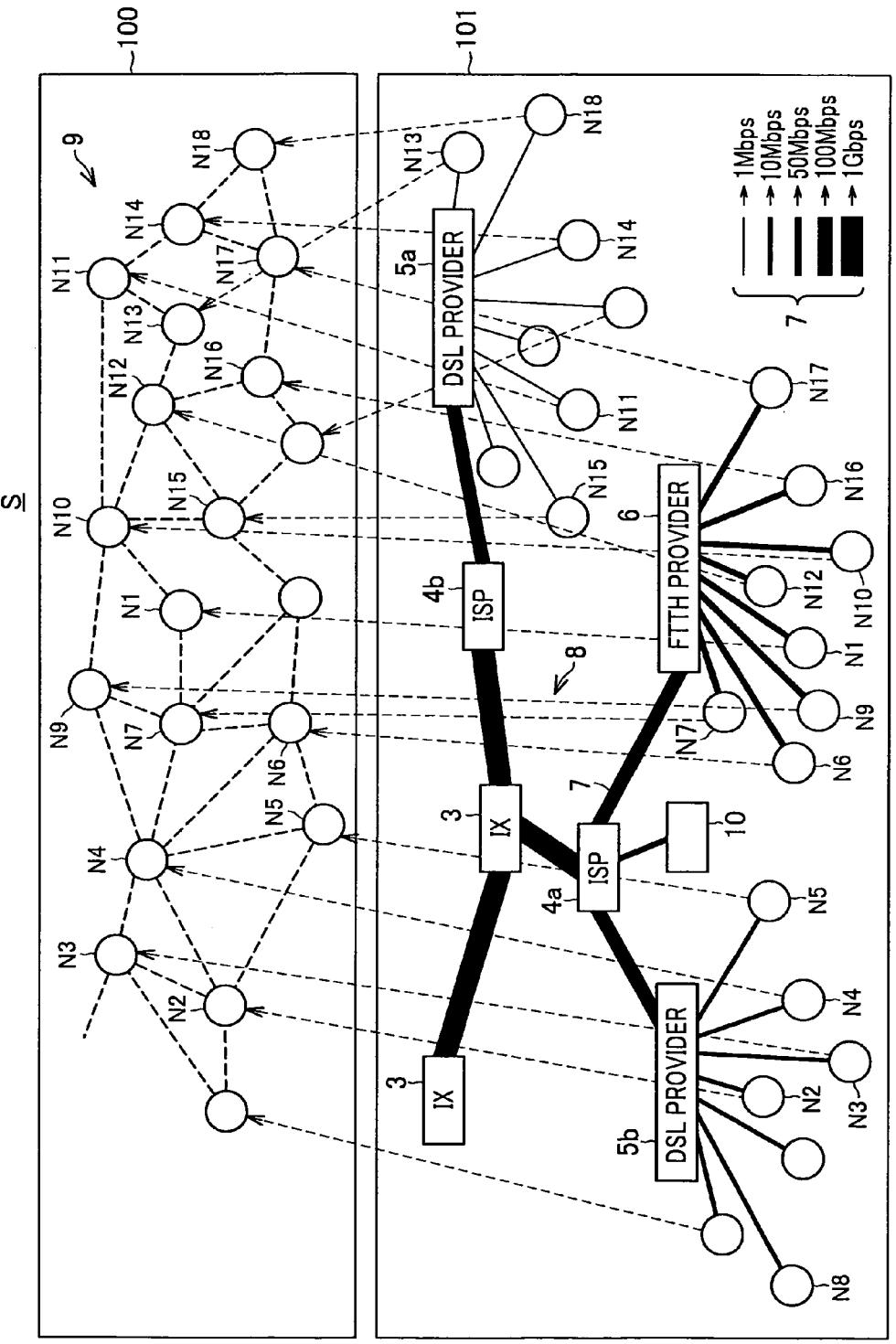
FIG. 1 is a diagram showing an example of a connection mode of each of node devices in a content disperse storage system S according to an embodiment of the present invention.

As shown in a lower frame 101 in FIG. 1, a distribution storage system S is constructed by connecting a plurality of node devices Nn via the Internet. As shown in the lower frame 101 in FIG. 1, a network 8 such as the Internet is constructed by Internet eXchanges (IXs) 3, ISPs (Internet Service Providers) 4a and 4b, apparatuses 5a and 5b of Digital Subscriber Line (DSL) providers, an apparatus 6 of an Fiber To The Home (FTTH) provider, communication lines 7, and so on. The network 8 is a communication network 8 of the real world. Although routers for transferring data packets are properly inserted in the network 8 in the example of FIG. 1, they are not shown in the diagram. As the communication lines 7, for example, a telephone line, an optical cable, and the like are used.

To such a network 8, a plurality of node devices Nn (n=any of 1, 2, 3, . . . ) are connected. In the following, the node devices will be called "nodes". To each of the nodes Nn, unique serial number and an Internet Protocol (IP) address are assigned. The content distribution storage system S according to the embodiment is a peer-to-peer network system formed by connecting some of those nodes Nn as shown in an upper frame 100 of FIG. 1.

A network 9 shown in the upper frame 100 in FIG. 1 is an overlay network 9 constructing a virtual link formed by using the existing network 8. The overlay network 9 as a logic network is realized by a specific algorithm, for example, an algorithm using a DHT. To each of nodes Nn connected to the content distribution storage system S, a node ID as peculiar identification information made of a predetermined number of digits is assigned.

A node ID is, for example, a value obtained by hashing the IP address or serial number assigned to each node Nn with a common hash function. The node IDs are disposed so as to be uniformly dispersed in an II) space. As a hash function, for example, SHA-1 or the like is used. In the hashed value, for example, the bit length is made of 160 bits. The node IDs are disposed so as to be uniformly dispersed in an ID space.

A node Nn, for example, a node N8 which is not connected to the content dispersion storage system S is connected to the system S by transmitting a participation message indicative of a request to participate in the content dispersion storage system to an arbitrary node Nn which is connected to the system S. Participation in the content distribution storage system S is carried out when the node device Nn is connected to the distribution storage system S and can obtain content data from the distribution storage system S. An arbitrary node Nn is, for example, a contact node which is always connected to the system S.

Each node Nn holds a routing table using the DHT from the beginning. In the routing table, transfer destinations of various messages on the content distribution storage system S are specified. Concretely, in the routing table, a plurality of pieces of node information including the node ID, the ID address, the port number, and the like of a node Nn moderately apart in the ID space are registered.

One node connected to the content distribution storage system S stores node information of the minimum number of nodes Nn as a routing table. By transfer of various messages among the nodes Nn, the node information of a node Nn which is not stored is obtained.

Since the routing table using the DHT is known like in Japanese Patent Application Laid-Open (JP-A) No. 2006-197400 and the like, its detailed description will not be repeated.

The content distribution storage system S stores replicas of various content data so as to be dispersed in a plurality of nodes Nn in a predetermined file format. In the following, the content data will be called "contents". Replicas can be used among the nodes Nn. The original of content is stored in the center server SA. For example, a replica of contents of a movie whose title is XXX is stored in a node N5. On the other hand, a replica of contents of a movie whose title is YYY is stored in a node N3. In such a manner, replicas are stored so as to be dispersed to the plurality of nodes Nn. In the following, the node N in which a replica of content is stored will be called "content holding node".

To the replica of the content, information such as content name and content ID as identification information peculiar to each content is added. The content ID is generated by, for example, hashing "content name+arbitrary numerical number" with a hash function common to that used at the time of obtaining the node ID. Alternately, the system administrator may give an arbitrary ID value to each content.

The location of a replica of any of contents which are dispersedly stored is stored as index information by a node Nn that manages (stores) the location of the replica of the content, or the like. In the following, the node Nn that manages (stores) the location of a replica will be called a "root node". The index information includes a set of the node information of the node Nn whose replica is stored and the content ID of the content. Such a root node is determined as, for example, the node Nn having a node ID closest to the content ID. The node ID closest to the content ID is, for example, a node ID having the largest number of upper digits matching those of the content ID.

For example, index information of a replica of content of a movie whose title is XXX is stored in a node N4 as the root node of the content. For example, the index information of a replica of content of a movie whose title is YYY is stored in a node N7 as a root node of the content. Such a root node is determined as a node Nn having a node ID closest to the content ID. The node ID closest to the content ID is, for example, a node ID having the largest number of upper digits matching those of the content ID.

In the case where the user of the node Nn wishes to obtain a replica of desired content, the node Nn desiring acquisition of the replica generates a message. In the following, a node Nn whose user desires to obtain a replica will be called a "user node". The message is a content location inquiry message including the content ID of content desired to be obtained and the IP address of the user node. The content location inquiry message is a message for retrieving a content holding node.

The content location inquiry message is transmitted to another node Nn in accordance with a DHT routing table obtained by the user node. That is, the user node transmits the content location inquiry message toward the root node. The content location inquiry message finally reaches the root node by the DHT routing using the content ID as a key.

In each node Nn, the attribute information such as the content name and the content ID of the content is described in the content catalog information. The content catalog information is generated by the center server SA and distributed to all of nodes Nn on the page information unit basis which will be described later. The details of the structure, content, a generating method, and the like of the content catalog information will be described later.

The content ID included in the content location inquiry message may be generated by hashing the content name with the common hash function by the user node. Since the DHT routing is known in Japanese Patent Application Laid-Open No. 2006-197400 and the like, the detailed description will not be repeated.

The root node which receives the content location inquiry message obtains the index information corresponding to the content ID included in the message from an index information cache. The obtained index information is returned to the user node as the transmitter of the content location inquiry message. The user node which obtained the index information can download (obtain) a replica of content on the basis of the index information. On the basis of the IP address and the like of the content holding node included in the index information, the user node accesses the content holding node. From the accessed content holding node, a replica of the content can be downloaded. In this case, the user node selects one of a plurality of content holding nodes. The user node can be connected to the selected content holding node and download a replica of the content.

The root node transmits a content transmission request message to the content holding node indicated by the IP address or the like included in the index information. By the message, the user node can also download the replica from the content holding node. Until the content location inquiry message reaches the root node, the user node can obtain the index information from a cache node which caches the same index information as that of the root node.

The user node which obtained a replica of the content from the content holding node and stored it generates a publish message. The publish message is a message for notifying the root node of the fact that the replica is stored. The publish message includes the content ID of the replica and node information of the node device which stores the replica. The publish message is transmitted toward the root node. Like the content location inquiry message, the publish message reaches the root node by the DHT routing using the content ID as a key. The root node receives the publish message. The root node stores the index information including the set of the node information and the content ID included in the publish message into an index information cache region. In such a manner, the user node newly becomes a content holding node that holds a replica of the content.

2. Structure and Content of Content Catalog Information

Next, the structure, content, and the like of the content catalog information will be described with reference to FIG. 2. Hereinafter, the content catalog information will be simply called catalog information.

The catalog information is information for managing the attribute information of contents as a list. The contents of the attribute information are stored in records. The catalog information is information by which content can be unconditionally specified" with a search key. The expression that "content can be specified means that record of the content can be retrieved. As a search key, for example, a value obtained by hashing a corresponding record or content name with a common hash function is used. The search key may be the content ID, content name, or the like. The search key is an example of the index information.

Figure 2:
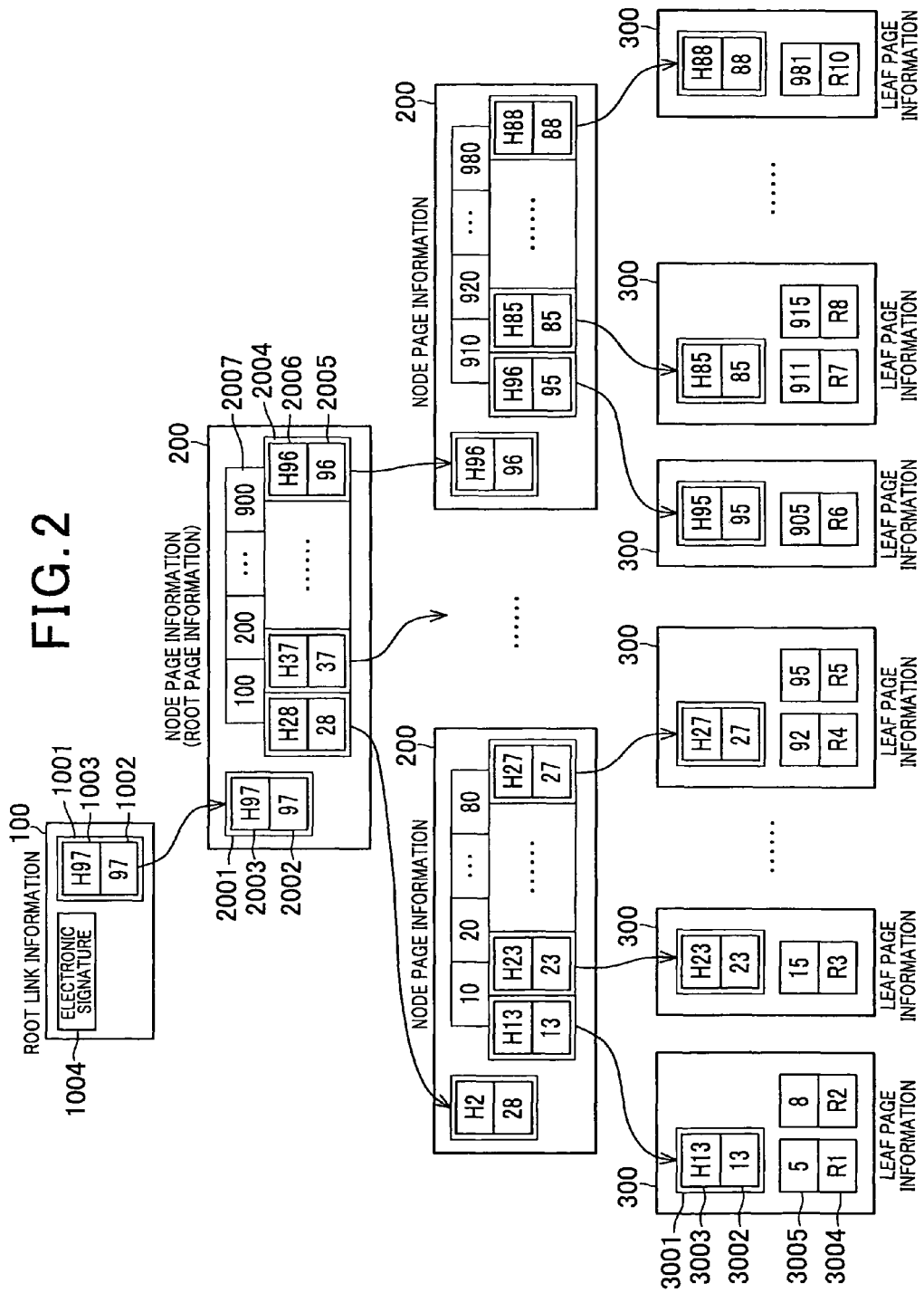
FIG. 2 is a diagram showing an example of a structure of content catalog information according to the embodiment.

To prevent falsification of the attribute information of content and to efficiently retrieve content, the catalog information used in the embodiment has the structure of a search tree shown in FIG. 2.

As shown in FIG. 2, the catalog information is constructed so that page information is associated with one another from root page information positioned at the root of the tree structure to leaf page information positioned at leaves. The root page information is an example of page information of the root. The page information directly associated with each other has a parental relation. It is assumed that page information Y is associated with page information X, that is, the page information X and Y has a parental relation. In the case where the distance from the root page information of the page information X is shorter than that of the page Y, the page information X is parental page information positioned in the parent viewed from the page information Y. The page information Y is child page information positioned in a child viewed from the page information X. The distance from the root page information is length corresponding to the number of links from the position of the root to a target node in the tree structure. In other words, the distance from the root page information corresponds to the number of pieces of page information from the root page information to target page information via associated information. In the following description, page information of a parent will be called parent page information, and page information of a child will be called child page information.

The association between the parent page information and the child page information is shown in link information. The link information is information stored in the parent page information and refers to the child page information. The link information includes page number of child page information and message digest for checking falsification of child page information.

The page number is a serial number peculiarly assigned to page information. Page information indicated by link information denotes page information to which the page number included in the link information is assigned. Although the details will be described later, in the case of updating certain page information, a new page number is assigned to the page information. Updating of page information in the embodiment means that page information obtained by updating original page information is newly generated as page information different from the original page information. In practice, a page number corresponds to, for example, a storage address used at the time of storing page information in a RAM. A page number is also an address of storing a pointer indicative of the position of storing page information. When page information is stored as a file, a page number corresponds to a file name.

A message digest is information for checking falsification of child page information indicated by link information or a record stored in child page information indicated by link information. The message digest is a value obtained by hashing an object to be checked whether it is falsified or not with a common hash function. The message digest is an example of falsification check information.

The catalog information has already root link information (numeral 100). In the root link information, information of a link to the root page information is stored (numeral 1001). The link information includes page number (numeral 1002) of the root page information and a message digest (numeral 1003). In the root link information, an electronic signature is stored (numeral 1004). An electronic signature is information for checking falsification of the root link information. An electronic signature includes, for example, information such as a signature value and certification information.

The page information is roughly divided to node page information (numeral 200) and leaf page information (numeral 300).

The node page information has at least one child page information. In the node page information, self link information (numeral 2001), information of a link to child page information (numeral 2004), and an index (numeral 2007) is stored. The self link information is information of a link to the node page information itself in which the self link information is stored. The self link information includes page number (numeral 2002) of the node page information and a message digest (numeral 2003). Therefore, the self link information is the same as information of the link to the node page information stored in parent page information of the node page information.

The information of the link to child page information includes page number (numeral 2006) of the child page information and a message digest (numeral 2005). It is assumed that when simply link information is referred to in node page information of the embodiment, it means information of a link to child page information, not, the self link information. In the node page information, a plurality of pieces of link information can be stored. The maximum number of pieces of link information which can be stored per node page information piece matches the order of a tree structure of catalog information. The order denotes the maximum number of children of a single parent. That is, the order corresponds to the number of "n" in an n-ary search tree.

An index has the same role as that of information called a value, a key, or the like of a node in a search tree. The index is information for searching page information in which a record of content is stored with a search key. The index shown in FIG. 2 is expressed in decimal notation for convenience. The index is an example of index information and information of a charge region.

The tree structure of catalog information has an order. Therefore, indexes stored in node page information are arranged, for example, so that their numbers are in ascending order. The link information is arranged in an order corresponding to the indexes. For example, the first link information indicates association with child page information in which indexes in a range of the value of the first index or less are stored. For example, the second link information indicates association with child page information in which indexes in a range of the value of the second index or less are stored. In the case where k pieces of link information are stored in certain node page information at present, k−1 pieces of indexes are stored in the node page information.

The leaf page information is, as described above, page information positioned in a leaf in a search tree. That is, the leaf page information does not have child page information. In leaf page information, self link information (numeral 3001), a record (numeral 3004), and an index (numeral 3005) are stored. The self link information is information of a link to leaf page information itself in which the self link information is stored. That is, the self link information includes the page number (numeral 3002) of the leaf page information and a message digest (numeral 3003). Therefore, the self link information is the same information as that of a link to the leaf page information stored in the parent page information of the leaf page information.

A record and an index are associated with other in a one-to-one manner. One set of a record and an index associated with each other or more sets is/are stored in the leaf page information. For one record, attribute information of a plurality of pieces of contents is set. For example, for a record, content ID, content publication start date and time, publication end date and time, content name, keyword, and the like are set. An index is information for unconditionally specifying a corresponding record. The kinds of information used as indexes of leaf page information are the same as those of information used as indexes of node page information. In the case where content ID, content name, or the like is used as the index, the information does not have to be included in settings of a record. The index is an example of index information.

The reasons why content can be retrieved efficiently in the case of using the catalog information having the structure described above will now be explained. In the case where the number of contents registered is "n", the amount of calculation of a search in sequential search is at the worst case O(n). On the other hand, since catalog information according to the embodiment has the structure of a search tree, the calculation amount of the search in a state where a tree is balanced is, as it is known, O(log n). Therefore, content can be retrieved efficiently.

Next, the reason why falsification of attribute information of content can be prevented will be described. Whether child page information is falsified or not is checked by information of a link to the child page information stored in the parent page information. That is, since the link information includes the message digest of the child page information, the falsification is checked on the basis of the message digest. In such a manner, from the leaf page information to the root page information, whether the child page information is falsified or not is checked by link information stored in the parent page information. Whether the root page information is falsified or not is checked by the root link information.

Generally, falsification cannot be reliably prevented only by the message digest. That is, if a necessary hash function can be obtained, the message digests can be calculated. The hash function is, for example, disclosed for checking falsification on the node Nn side. A malicious person can falsify the contents of page information and calculate the message digest with the falsified contents. By setting the message digest in the parent page link information, whether the contents are falsified or not cannot be known.

On the contrary, in the catalog information according to the embodiment, an electronic signature for assuring authenticity of the root link information is given to the root link information. For example, in the case of using the public key system for an electronic signature, if a secret key necessary for an electronic signature is not obtained by a third party, falsification of the root link information can be checked. If it is determined by the falsification check using an electronic signature that the root link information is authentic, it can be determined that the message digest in the root page information included in the root link information is also authentic. Next, when it is determined by the falsification check using the authentic message digest that the root page information is authentic, it can be determined that the message digest in the child page information included in the link information stored in the root page information is also authentic. In such a manner, from the root page information to the leaf page information, authenticity of the child page information is assured by the message digest in the link information stored in the parent page information. As a result, falsification of the entire catalog information can be prevented.

As described above, although an electronic signature is generated only for the root link information in the foregoing embodiment, an electronic signature may be generated to all of page information. Since an electronic signature is generated by setting information such as certification information or the like, generally, security for an electronic signature is increased more than that for a message digest. The calculation amount of processes such as encoding for increasing the security and decoding at the time of checking falsification is large, and the data amount necessary for an electronic signature such as electronic certification information is accordingly large. Consequently, both the calculation amount and the data amount of page information of the message digest are smaller than those of the electronic signature. On the other hand, in the case of generating the electronic signature for all of page information, the root link information is not essential. In this case, it is sufficient to store the electronic signature for the root page information.

As falsification of the catalog information, except for falsification of the contents of the page information itself, falsification of replacing page information with old page information also exists. To be specific, although the contents of page information are updated by adding or deleting contents, the contents of page information are replaced with page information which is before updating. The old page information itself is also authentic. Therefore, the latest page information has to be discriminated.

In the catalog information according to the embodiment, a page number is assigned to each page information piece. The same page number is not assigned to a plurality of page information pieces. Further, in the embodiment, at the time of updating page information, the contents of the page information are not rewritten. In the embodiment, new page information separately from the original page information is generated, and updated contents are set in the new page information. At this time, a page number different from that of the original page information is assigned to the new page information. Concretely, each time new page information is generated, the latest page number which is not assigned to any of page information generated in the past is assigned. For example, when the page number assigned last is 100, the page number assigned to page information newly generated next is 101. The page number is set in the link information stored in the parent page information. Therefore, the link information stored in the node page information always refers to the latest child page information. If the page number of the link information is falsified to an old page number, it is falsification of the contents of the page information. Therefore, the falsification can be found by the above-described method.

In the embodiment, in the case of updating page information, new page information is generated as described above. However, the contents of the page information itself may be rewritten.

The structure of the catalog information described above using FIG. 2 is just an example. As the structure of the catalog information, as long as the structure is a tree structure in which a record of content can be retrieved, any structure may be employed.

For example, a record may be stored not only in the leaf page information but also in the node page information. The order of the tree structure, that is, the maximum number of pieces of link information which can be stored in single node page information piece is arbitrary. The maximum number of records which can be stored in single page information piece may be one or more. Further, the self link information is not essential.

Further, an index of the node page information is not essential. For example, in the case of a trie, an index of the node page information is unnecessary. That is, in a trie, the position of page information on a tree structure corresponds to an index, and the root page information to the leaf page information is followed in the tree in accordance with the value of a bit, a character, or the like of a search key. For example, it is assumed that four bits are assigned to each of node page information pieces from the most significant four digits of the search key. In this case, one node page information piece includes a sequence of 16 link information pieces as elements. For example, in the case where a search key is hexadecimal and is F3405B9C, F in the upper first digit in the root page information is the index of the sequence. That is, link information stored in the 16th place in the sequence in the root page information is link information to child page information to be referred to next. After that, "3" in the second highest digit is the index of the sequence in child page information of the root page information. That is, link information stored in the fourth place in the sequence in the child page information becomes link information to the child page information to be searched next. When the search reaches the leaf page information, the entire search key and the index of the record are compared. In such a manner, the search is performed.

Further, the index of the leaf page information is also not essential. For example, in a trie, records having indexes whose values are relatively far from each other may be held together. For example, it is assumed that the index is hexadecimal and there are a record of F3405B9C and a record of F34013A2. The values of the upper three digits of the two indexes are the same. In this case, if another record whose upper three digits are F34 does not exist and two or more records can be stored in single leaf page information piece, the two records can be stored in the same leaf page information. That is, two records are stored in the leaf page information which is reached from the root page information via F, 3, and 4. In this case, the index of the record is necessary for the leaf page information. On the other hand, for example, it is assumed that node page information is always generated up to the upper seven digits of a search key, and the value of the fourth lowest digit in the search key is assigned to leaf page information. In this case, the leaf page information includes a sequence storing 16 records as elements. A record whose index is F3405B9C is stored in the tenth place in the sequence in leaf page information reached from the root page information via F, 3, 4, 0, 5, B, and 9. In this case, an index of a record is unnecessary for the leaf page information.

Further, a concrete example will be described. It is assumed that an index of content, which is quaternary and made of four digits is used. In this case, four pieces of link information can be stored in each node page. For example, the root page information includes a sequence of storing link information pieces indicating page information in which the values of an upper digit of the indexes correspond to 0, 1, 2, and 3. In this case, information of a link to the page information corresponding to 0 of an upper digit in the index is stored in the position corresponding to 0 of the value of the highest digit. In the position where the value of the highest digit corresponds to 1, information of a link to page information corresponding to 1 of the highest digit of the index is stored. In the position where the value of the highest digit corresponds to 2, information of a link to the page information corresponding to 2 of the highest digit of the index is stored. In the position where the value of the highest digit corresponds to 3, information of a link to the page information corresponding to 3 of the highest digit of the index is stored.

For example, page information in which the value of an upper digit in an index corresponds to "1" has a sequence storing link information indicating page information in which values of upper two digits of indexes correspond to 10, 11, 12, and 13. In this case, information of a link to page information in which the values of upper two digits of an index correspond to 10 is stored in a position where the value of the second highest digit corresponds to 0. In a position where the value of the second highest digit corresponds to 1, information of a link to the page information in which the values of upper two digits of an index correspond to 11 is stored. In a position where the value of the second highest digit corresponds to 2, information of a link to page information in which the values of upper two digits of the index correspond to 12 is stored. In a position where the value of the second highest digit corresponds to 3, information of a link to page information in which the values of upper two digits of the index correspond to 13 is stored.

For example, page information in which the values of two upper digits in an index correspond to "10" has a sequence storing link information indicating page information in which values of upper three digits of indexes correspond to 100, 101, and 103. In this case, information of a link to page information in which the values of upper three digits of an index correspond to 100 is stored in a position where the value of the third highest digit corresponds to 0.

Next, for example, page information in which the values of three upper digits in an index correspond to "102" is leaf page information. The page information in which values of upper three digits of indexes correspond to 102 has a sequence of storing four records having the values of indexes are 1020, 1021, 1022, and 1023. In this case, a record whose index is 1020 is stored.

The kind of the tree may be, for example, a B tree, a B+ tree, a balanced tree such red-black tree, or a simple n-ary search tree having no balance.

3. Addition, Deletion, and Retrieval of Record to/from Content Catalog Information Next, methods of adding a record to catalog information, deleting a record from catalog information, and retrieving a record will be described with reference to FIGS. 3A to 3E and FIGS. 6A and 6B.

In the case of adding or deleting a record, updating of catalog information, that is, updating of page information is necessary. At this time, the rules of updating page information in the embodiment are as follows.

(1) Obviously at the time of adding page information, also at the time of updating page information, page information obtained by updating contents of original page information is newly generated. For example, in the case where page information is generated and stored in a RAM, new page information is generated in an address different from an address in which the original page information is stored. Also at the time of updating root link information, root link information whose contents are updated is newly generated.

(2) When page information is newly generated, page numbers are assigned in order of generation.

(3) When page information is newly generated, a message digest of new page information is calculated.

(4) When root link information is newly generated, an electronic signature for new root link information is generated.

(5) The page number of newly generated page information and a message digest are set as new link information to page information in parent page information. That is, the parent page information has to be also updated. In the case where root page information is newly generated, the page number of the root page information and the message digest are set as new link information to the page information in the root link information. That is, the root link information has to be also updated.

(6) Updating of page information starts from page information to/from which a record is added/deleted. Page information existing on a path from the page information to/which a record is added/deleted to the root page information is updated in order from the page information furthest from the root page information. That is, when it is assumed that the root page information is positioned upward and the leaf page information is positioned downward, the page information is updated in order from bottom.

The rules (1) and (2) are provided to prevent old page information from being inserted in the catalog information. The rules (3) to (5) are provided to prevent falsification of contents of catalog information. The rule (6) is derived from the rule (5) in order to prevent falsification of catalog information. Those rules are rules in the embodiment. For example, as described above, the rule (1) is not essential in the present invention.

When new page information is generated; old page information, that is, page information which is not referred to may be deleted at the time when the page information becomes information which is not referred to. Old page information may be periodically deleted.

On the basis of the above rules, the method of adding, deleting, and retrieving a record will be described below.

3.1 Initial State

An initial state in catalog information is a state where no record is registered and it is ready for registering a record. The catalog information in the initial state is generated in a root link information registering process executed from an initializing process which will be described later of the center server SA.

Figure 3A:
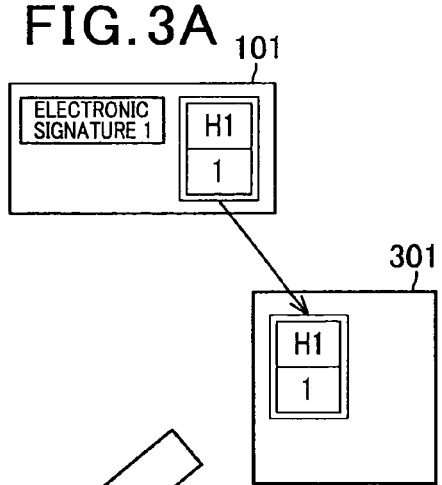
FIGS. 3A to 3E are diagrams showing an example of a state of catalog information in an initial state and a state where the catalog information is updated in the case where a record is added.

As shown in FIG. 3A, first, empty root page information 301 is generated. "Empty page information" denotes page information which does not include link information and a record. A page number is assigned to the root page information 301. Since the first page information is generated, 1 is assigned as the page number. A message digest H1 of the root page information 301 to which the page number is assigned is calculated. In the case of making self link information included in the page information, a message digest of entire page information except for a part in which a message digest of the self link information is set is calculated.

Next, root link information 101 is generated. In the root link information, the page number 1 of the root page information and the message digest H1 are set. In addition, an electronic signature 1 of the root link information 101 is generated. The electronic signature is generated for the entire root link information except for the part in which the electronic signature itself is set. The electronic signature 1 is set in the root link information. By the root link information 101 and the root page information 301, the initial state of the catalog information is constructed.

3.2 Addition of Record

A record is added to catalog information in a record adding process which will be described later of the center server SA. In the case of adding a new record, the new record and a search key for the new record are necessary. The search key may be designated separately from a new record, or a content ID, content name, or the like which is set for the new record may be used. Alternatively, a value obtained by hashing the contents of a record may be used as a search key.

Figure 3B:
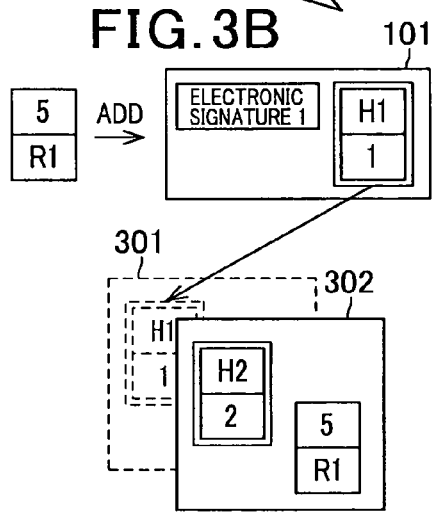

It is assumed that a new record R1 is added in the initial state of catalog information. On the basis of the contents of link information set in the root link information 101, the root page information 301 of the page number 1 is referred to. Since the root page information 301 is empty, a record can be added. Therefore, as shown in FIG. 3B, root page information 302 to which the new record R1 is added is newly generated. As necessary, a search key for the new record is added to the root page information 302 as an index of the new record. The latest page number 2 is assigned to the root page information 302, and a message digest H2 is calculated.

Figure 3C:
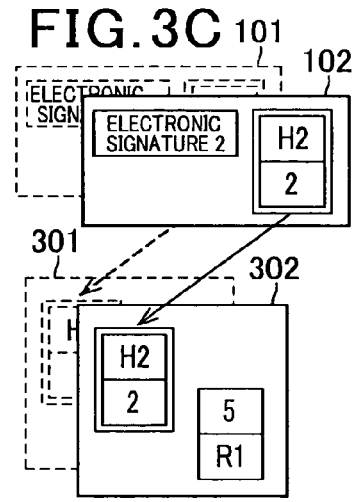

As shown in FIG. 3C, root link information 102 in which the page number 2 and the message digest H2 are set is newly generated. An electronic signature 2 for the root link information 102 is generated.

Figure 3D:
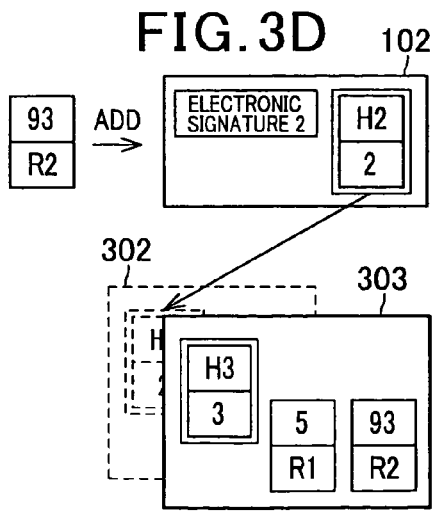

It is now assumed that a new record R2 is generated. The number of records stored in the root page information 302 is 1. When it is assumed that the number of records which can be stored in leaf page information is, for example, 3, a record can be added to the root page information 302. Therefore, as shown in FIG. 3D, root page information 303 to which the new record R2 is added in addition to the record R1 is newly generated. The latest page number 3 is assigned to the root page information 303, and a message digest H3 is calculated.

Figure 3E:
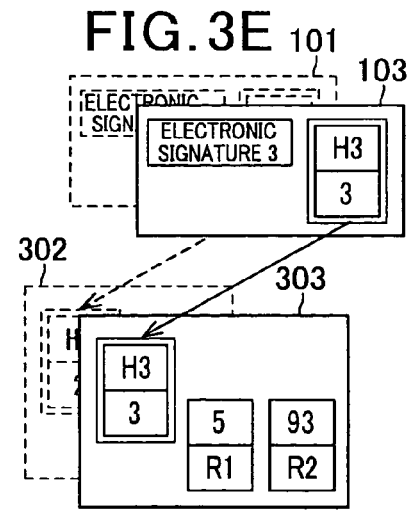

As shown in FIG. 3E, root link information 103 in which the page number 3 and the message digest H3 are set is newly generated. An electronic signature 3 of the root link information 103 is generated.

In a manner similar to the above, the new record R3 is added to the root page information. As a result, root page information 304 storing the three records and root link information 104 is generated.

It is now assumed that a new record R4 is added. As shown in FIG. 4A, there is no room to add a record any more in the root page information 304. Consequently, the page information is divided. A dividing method is arbitrary and is varied according to the type of the tree, algorithm, and the like. Only one example will be described here.

For example, the contents of the root page information 304 are divided into three parts. As shown in FIG. 4B, leaf page information 305 that stores the record R1, leaf page information 306 storing records R3 and R4, and leaf page information 307 storing a record R2 is newly generated. A new record to be added to a piece of leaf page information out of newly generated leaf page information pieces is determined by a search key of the new record. A page number is assigned to each leaf page information newly generated, and a message digest is calculated.

If parent page information exists in the page information which is before division, the division of the page information may be finished at this stage. However, in the case where the page information before division is root page information, parent page information does not exist. Parent page information that stores link information to each of divided page information pieces is necessary. Therefore, as shown in FIG. 4C, root page information 201 is newly generated. In the root page information 201, link information to leaf page information 305, 306, and 307 is set. In the case where an index is necessary, an index having proper contents is set in the root page information 201. The latest page number 8 is assigned to the root page information 201, and a message digest H8 is calculated.

Subsequently, as shown in FIG. 4D, the root link information 104 in which the page number 8 and the message digest H8 are set is newly generated. An electronic signature 5 of the root link information 104 is generated.

Figure 5:
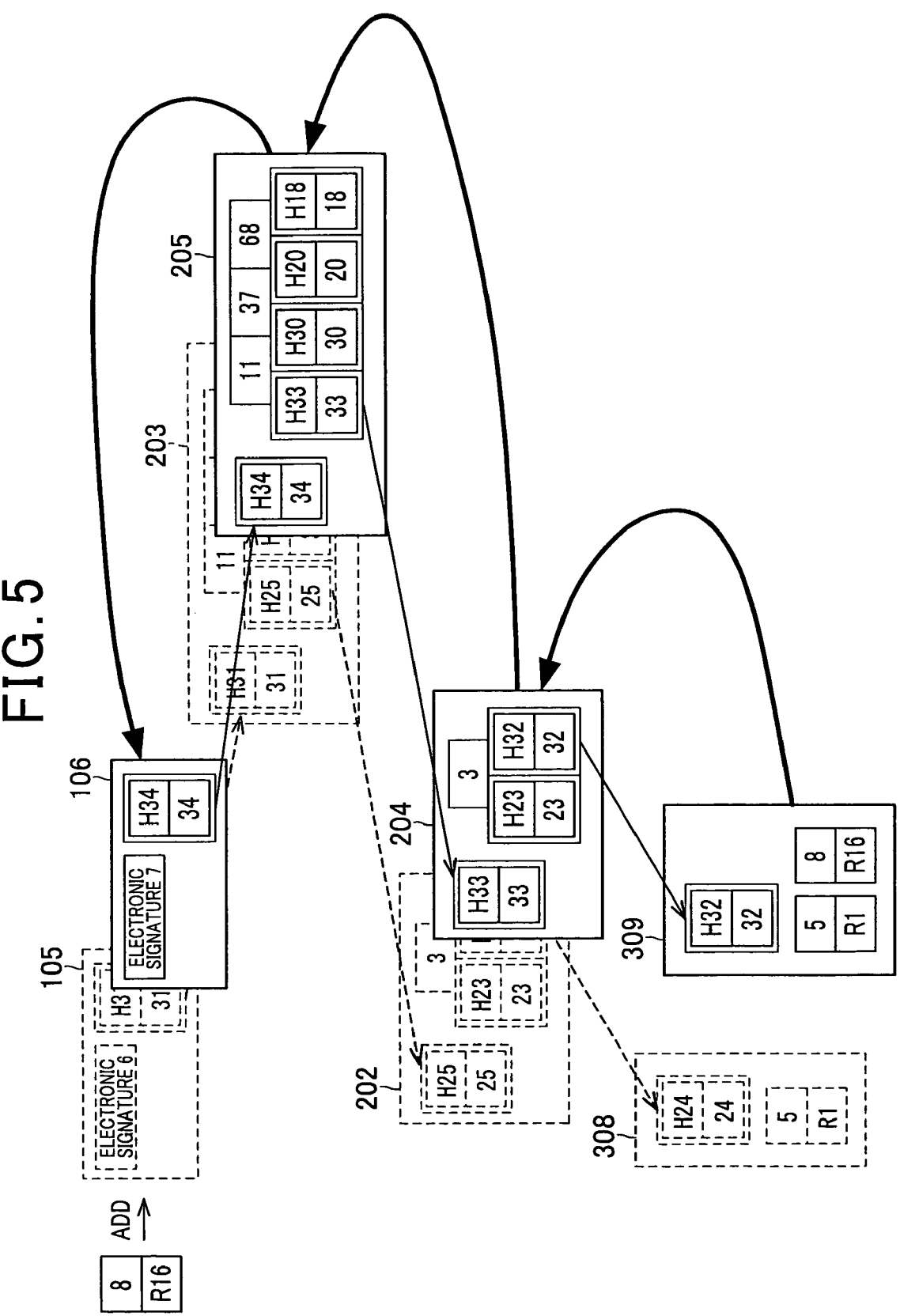
FIG. 5 is a diagram showing an example of a state where the catalog information is updated in the case where a record is added.
Figures 6A, 6B:
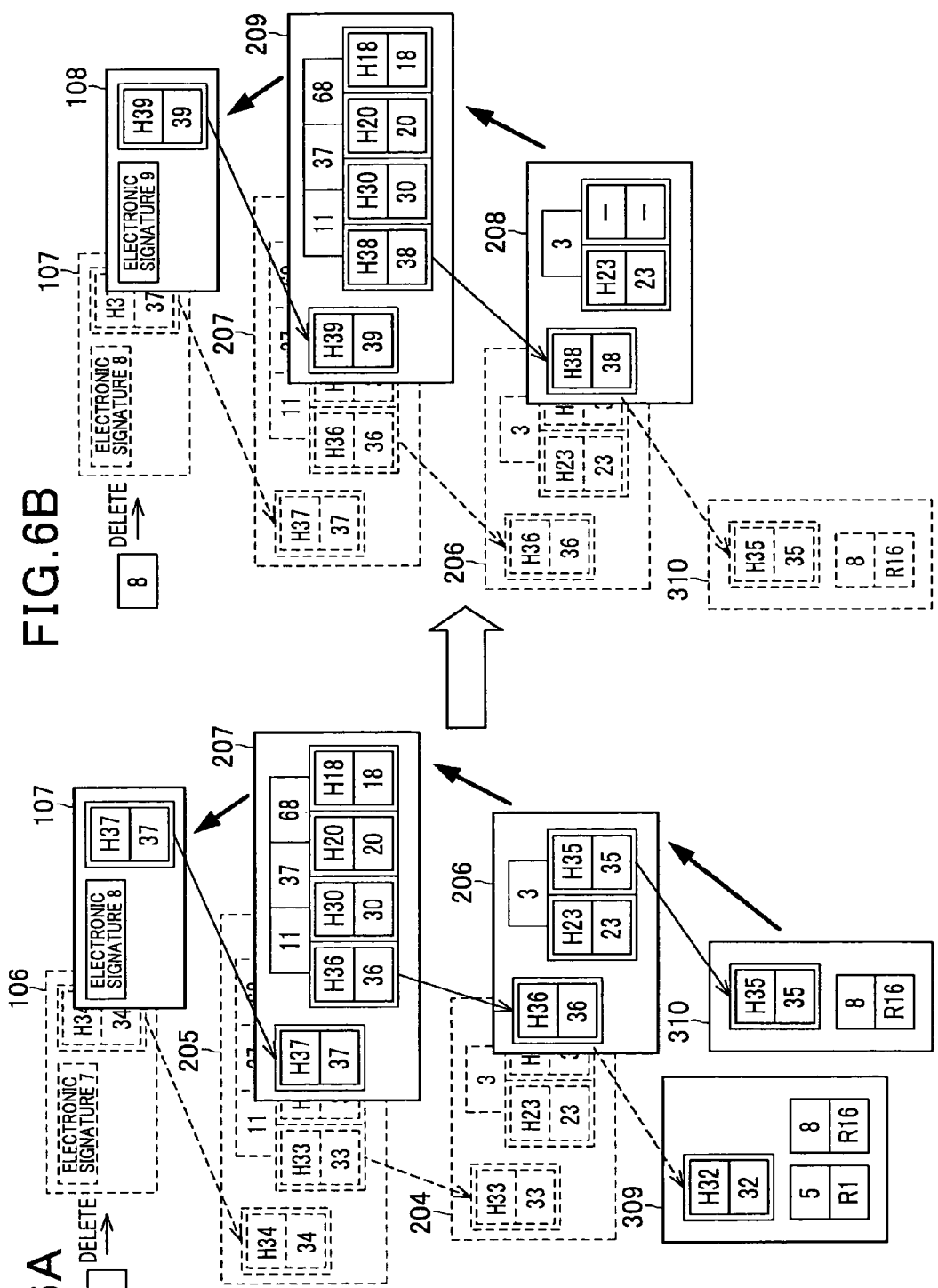
FIGS. 6A and 6B are diagrams showing an example of a state where the catalog information is updated in the case where a record is deleted.

As shown in FIG. 5, it is assumed that the catalog information includes root link information 105, root page information 203, node page information 202 as a child of the root page information 203, and leaf page information 308 as a child of the node page information 202. It is assumed that a new record R16 is added. On the basis of a search key of the record R16 and the index of the page information, for example, page information to which the new record R16 is to be stored is searched in order of the root link information 105, the root page information 203, the node page information 202, and the leaf page information 308. If a record can be added to the leaf page information 308, new leaf page information 309 replacing the leaf page information 308 is generated. In the leaf page information 309, the record R1 stored in the leaf page information 308 and the new record R16 are set. The latest page number 32 is assigned to the leaf page information 309, and a message digest H32 is calculated.

As the node page information 202, since information of a link to the child page information of the node page information 202 is changed, new node page information 204 replacing the node page information 202 is generated. In the node page information 204, the link information and the index stored in the node page information 202 is set. In the set link information, a page number 24 and a message digest H24 as information of a link to the leaf page information 308 are rewritten with the page number 32 and the message digest H32 as information of a link to the leaf page information 309. A latest page number 33 is assigned to the node page information 204, and a message digest H33 is calculated.

As the root page information 203, the information of the link to the child page information of the root page information 203 is changed. Consequently, new root page information 205 replacing the root page information 203 is generated. A method of generating the root page information 205 is similar to that of generating the node page information 204.

Since information of a link to the root page information 203 is changed, new root link information 106 replacing the root link information 105 is generated.

3.3 Deletion of Record

A record is deleted from catalog information in a record deleting process which will be described later of the center server SA. In the case of deleting a record, a search key of a record to be deleted is necessary.

It is assumed that catalog information is in a state after the new record R16 described with reference to FIG. 5 is added, and 5 is designated as a search key of a record to be deleted. On the basis of the value 5 of the search key and the index of each page information, for example, retrieval of page information storing a record corresponding to the search key is performed in order of the root link information 106, the root page information 205, the node page information 204, and the leaf page information 309 shown in FIG. 6A.

Since a record is stored in the leaf page information 309, the index of the record and the search key are compared with each other. The value 5 of the search key coincides with the value 5 of the index of the record R1. Therefore, new leaf page information 310 replacing the leaf page information 309 is generated. In the leaf page information 310, a record other than the record R1 out of the records stored in the leaf page information 308 is set. The latest page number 35 is assigned to the leaf page information 310, and a message digest H35 is calculated.

After that, node page information 206 replacing the node page information 204, root page information 207 replacing the root page information 205, and root link information 107 replacing the root ink information 106 is newly generated in this order. A method of generating the page information is similar to that in the case described with reference to FIG. 5.

It is further assumed that 8 is designated as a search key of a record to be deleted. On the basis of the value 8 of the search key and the index of each page information, for example, retrieval is performed in order of the root link information 107, the root page information 207, the node page information 206, and the leaf page information 310 shown in FIG. 6B. In the leaf page information 310, the value 8 of the index and the record R16 are stored. Therefore, the record R16 is deleted.

After the record R16 is deleted, the leaf page information 310 becomes empty. Since the leaf page information which becomes empty is unnecessary, it is not necessary to generate new leaf page information replacing the leaf page information 310. New node page information 208 replacing the node page information 206 is generated. In the node page information 208, the link information and indexes stored in the node page information 206 are set. In the set link information, page number 35 as information of a link to the leaf page information 310 and the message digest H35 are rewritten to invalid values. As a result, the leaf page information 310 will not be referred to hereinafter. The latest page number 38 is assigned to the node page information 208, and a message digest H38 is calculated.

After that, root page information 209 replacing the root page information 207 and root link information 108 replacing the root link information 107 is newly generated in this order.

3.4 Retrieval of Record

A record is retrieved in a record retrieving process which will be described later of the center server SA. In the case of retrieving a record, a method of retrieving page information that stores a record to be retrieved is similar to that of retrieving a node in a tree structure. That is, the page information retrieving method depends on a search algorithm corresponding to the tree structure of the catalog information. Also in the case of adding or deleting a record, a similar retrieving method is used. In the following, an example of the record retrieving method will be described with reference to FIG. 5.

As shown in FIG. 5, it is assumed that the catalog information includes root link information 106, the root page information 205, the node page information 204, and the leaf page information 309. It is assumed that 8 is designated as a search key of a record to be retrieved. First, the page number 34 which is set in the root link information is referred to.

Since the page number 34 is that of the root page information 205, next, the root page information 205 is referred to. The search key and each of indexes stored in the root page information 205 are compared with each other. In the root page information 205, as indexes, 11, 37, and 68 are stored. When the value 5 of the search key and the value 11 of the index are compared, the value of the search key is smaller. Therefore, the page number 33 included in the link information indicating the page information whose index value is smaller than 11 is referred to. In the root page information 205, not only information of a link to the page information corresponding to the page number 33 but also information of links to the page information corresponding to the page numbers 30, 20, and 18 is also stored. In FIG. 5, page information corresponding to the page numbers 30, 20, and 18 is not shown.

Since the page number 33 is that of the node page information 204, next, the node page information 204 is referred to. In the node page information 204, as an index, 3 is stored. When the value 5 of the search key and the value 3 of the index are compared, the value of the search key is larger. Therefore, the page number 32 included in the link information indicating the page information whose index value is larger than 3 is referred to. In the node page information 204, not only information of a link to the page information corresponding to the page number 32 but also information of a link to the page number 23 is also stored. In FIG. 5, page information corresponding to the page number 23 is not shown.

Since the page number 32 is that of the leaf page information 309, next, the leaf page information 309 is referred to. In the leaf page information 309, 5 and 8 are stored as indexes. When the value 8 of the search key and each of the indexes are sequentially compared with each other, the value of the index of the record R16 and the value 8 of the search key coincide. As a result, the record R16 is retrieved.

In the embodiment, at the time of retrieving page information in addition, deletion, and retrieval of a record, a falsification check is made. The falsification check is made on page information to be referred to.

In the example, first, a falsification check on the root page information 209 is made using the message digest H34 which is set in the root link information 108. Next, a falsification check on the node page information 208 is made using the message digest H33 which is set in the root page information 209. Finally, a falsification check of the leaf page information 309 is made using the message digest H32 which is set in the node page information 208. A falsification check on the root link information is made in an initializing process which will be described later of the center server SA.

As described above, the falsification check is made when page information is actually referred to, so that authenticity of page information referred to is reliably assured. In addition, since the falsification check is made only on page information referred to, it is efficient. However, such a falsification check may not be performed each time a record is added, deleted, or retrieved. For example, a falsification check may be made periodically or in response to an instruction from an operator.

4. Configuration of Center Server SA

Figure 7:
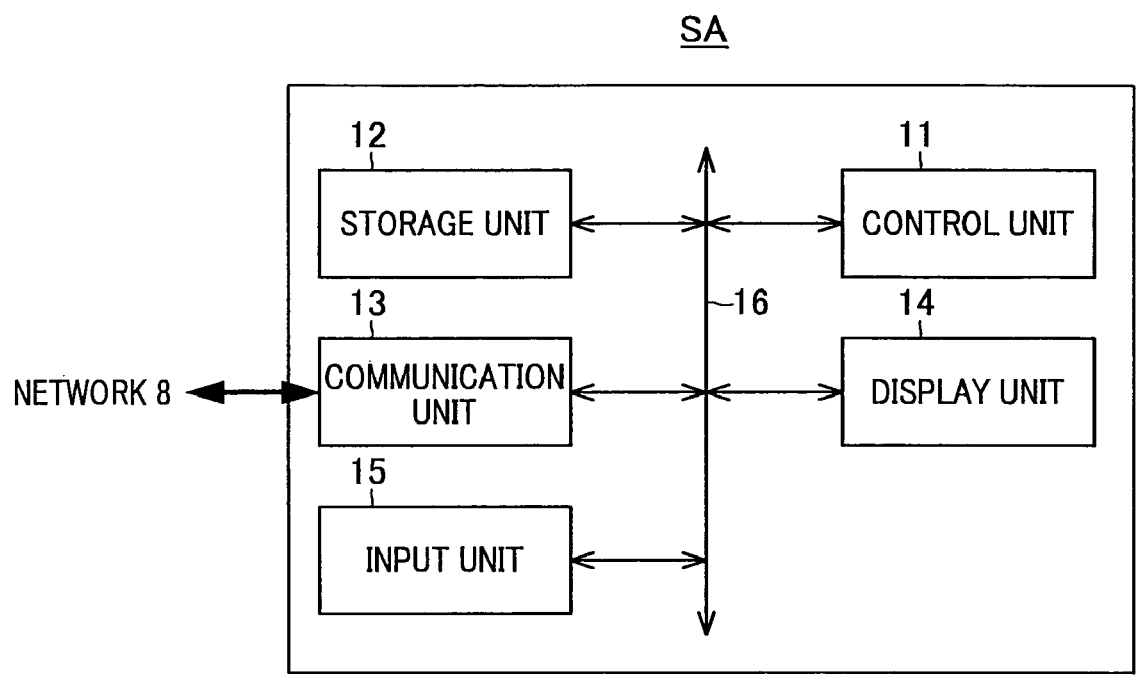
FIG. 7 is a diagram showing an example of components of a center server SA according to the embodiment.

FIG. 7 is a diagram showing an example of a schematic configuration of the center server SA.

The center server SA has, as shown in FIG. 7, a control unit 11 including a CPU having a computing function, a RAM for work, and a ROM that stores various data and programs. The center server SA also has a storage unit 12 constructed by an HD or the like for storing various data and various programs. The center server SA further has a communication unit 13 for controlling communication of information with a node Nn via the network 8 or the like. The center server SA also has a display unit 14 such as a CRT or a liquid crystal display that displays various information. Further, the center server SA has an input unit (for example, a keyboard, a mouse, and the like) 15 for receiving an instruction from an operator and giving an instruction signal according to the instruction to the control unit 11. The control unit 11, the storage unit 12, the communication unit 13, the display unit 14, and the input unit 15 are connected to each other via a bus 16. The input unit 15 is an example of an addition inputting device, a deletion inputting device, and a retrieval inputting device in the present invention. The storage unit 12 is an example of a page information storing device in the invention. The storage unit 12 may be a volatile memory or a nonvolatile memory.

In the storage unit 12, the node ID, the ID address, the port number and the like of each of the nodes Nn are stored. In the storage unit 12, a catalog database in which catalog information is registered on the unit basis of root link information and page information is constructed. Further, in the storage unit 12, a database management program for managing the catalog database is stored. The database management program is an example of an information generation program.

When the CPU reads and executes a program such as the database management program stored in the storage unit 12 and the like, the control unit 11 functions as a leaf page information generating device, a root page information generating device, a node page information generating device, a root link information generating device, an addition inputting device, an addition leaf page determining device, a registering device, an assigning device, a determining device, a deletion leaf page determining device, a retrieval inputting device, and a retrieving device.

The database management program may be, for example, downloaded from a predetermined server on the network 8 or recorded on a recording medium such as a CD-ROM and read via a drive of the recording medium.

5. Configuration and Function of Node Nn

Next, the configuration and operation of node Nn will be described with reference to FIG. 8.

Figure 8:
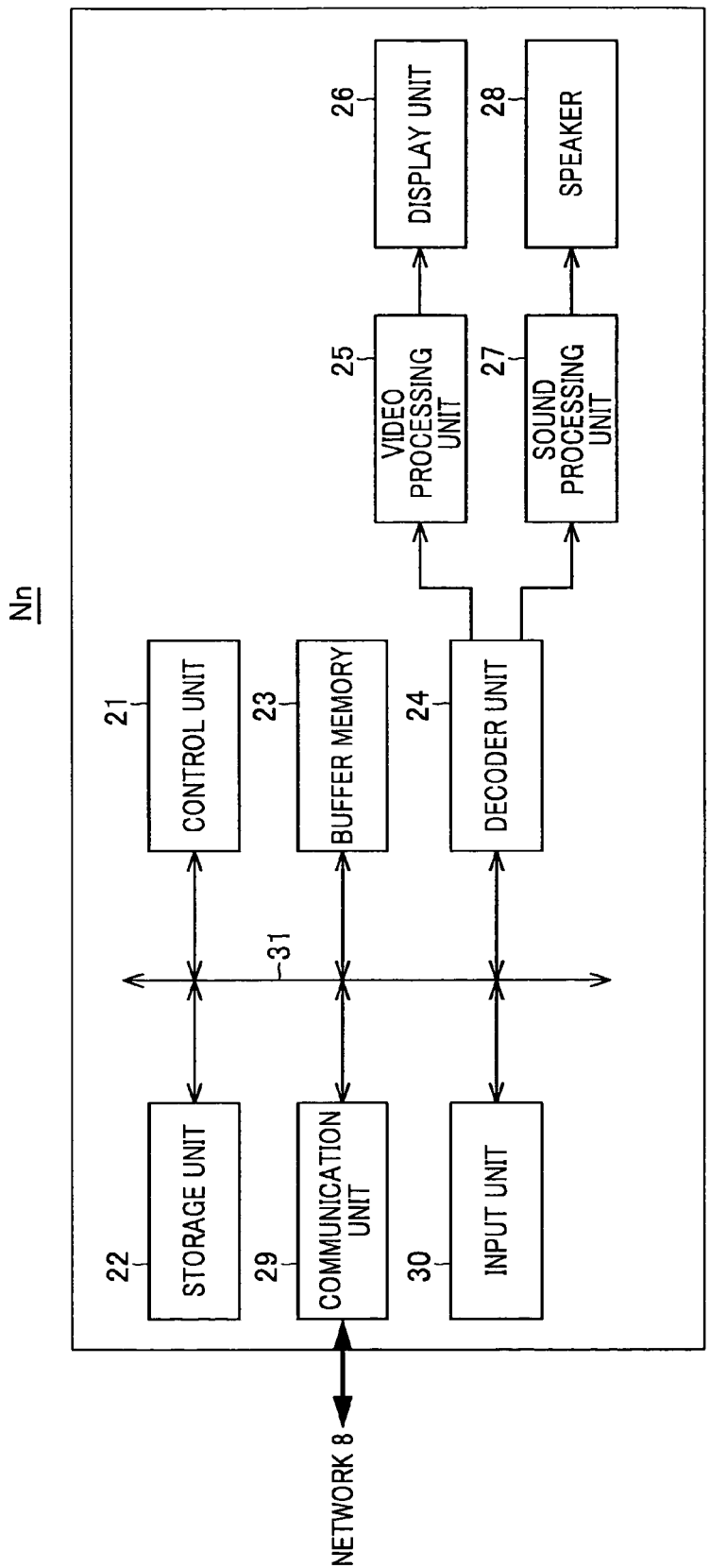
FIG. 8 is a diagram showing an example of components of a node Nn according to the embodiment.

Each node Nn has, as shown in FIG. 8, a control unit 21 as a computer including a CPU having a computing function, a RAM for work, and a ROM that stores various data and programs. The node Nn also has a storage unit 22 constructed by an HD or the like for storing various data and various programs and a buffer memory 23 for temporarily storing a replica of received content, or the like. Each the node Nn further has a decoder unit 24 for decoding video data (video information), audio data (audio information), and the like encoded and included in a replica of content. The node Nn further has a video processing unit 25 performing a predetermined imaging process on the decoded video data or the like and outputting the resultant as a video signal, and a display unit 26 such as a CRT or a liquid crystal display that displays an image on the basis of the video signal output from the video processing unit 25. The node Nn further includes a sound processing unit 27 for D (Digital)/A (Analog) converting the decoded audio data to an analog audio signal, amplifying it by an amplifier, and outputting the amplified signal, and a speaker 28 for outputting the audio signal output from the sound processing unit 27 as sound waves. The node Nn further includes a communication unit 29 for controlling communication of information with another node Nn or the like via the network 8. The node Nn also has an input unit (for example, a keyboard, a mouse, a remote controller, an operation panel, and the like) 30 for receiving an instruction from a user and giving an instruction signal according to the instruction to the control unit 21. The control unit 21, the storage unit 22, the buffer memory 23, the decoder unit 24, the communication unit 29, and the input unit 30 are connected to each other via a bus 31. As the node Nn, for example, a personal computer, Set Top Box (STB), or the like can be applied.

In the storage unit 22, a routing table using the DHT and indexes are stored. In the storage unit 22, the IP address and the port number of a contact node as an access destination at the time of participating in a content distribution storage system S, and the IP address and the port number of the center server SA are stored. In the storage unit 22, page information obtained from another node Nn and page information distributed from the center server SA is stored as files.

When the CPU reads and executes a program stored in the storage unit 22 and the like, the control unit 21 performs various processes.

For example, at the time of connection to the content distribution storage system S, the control unit 21 obtains the latest root link information and page information from another node Nn. The node Nn as the acquisition destination from which the information is obtained may be, for example, a contact node. The control unit 21 receives root link information and page information distributed from the center server SA. Root link information obtained from another node Nn or the center server SA is stored in the RAM. Page information obtained from another node Nn or the center server SA is stored in the storage unit 22.

The control unit 21 retrieves a record of content on the basis of the root link information stored in the RAM and the page information stored in the storage unit 22. The retrieving method is basically the same as the method of retrieving a record in the center server SA. The control unit 21 performs a necessary process on the basis of the contents of the retrieved record. For example, the control unit 21 makes information of a record displayed on the display unit 26, determines whether contents are open or not, and obtains contents from a content holding node on the basis of the content ID included in the record.

The program may be, for example, downloaded from a predetermined server on the network 8 or recorded on a recording medium such as a CD-ROM and read via a drive of the recording medium.

6. Operation of Content Disperse Storage System S

The operation of the content disperse storage system S according to the embodiment will now be described with reference to FIGS. 9 to 16.

In the following, description will be given on assumption that catalog information has the structure of a general n-ary search tree. Processes peculiar to the kind, structure, and the like of the tree will not be described. Processes related to self link information which is not essential for page information will not be described.

6.1 Operation of Center Server SA

Figure 9:
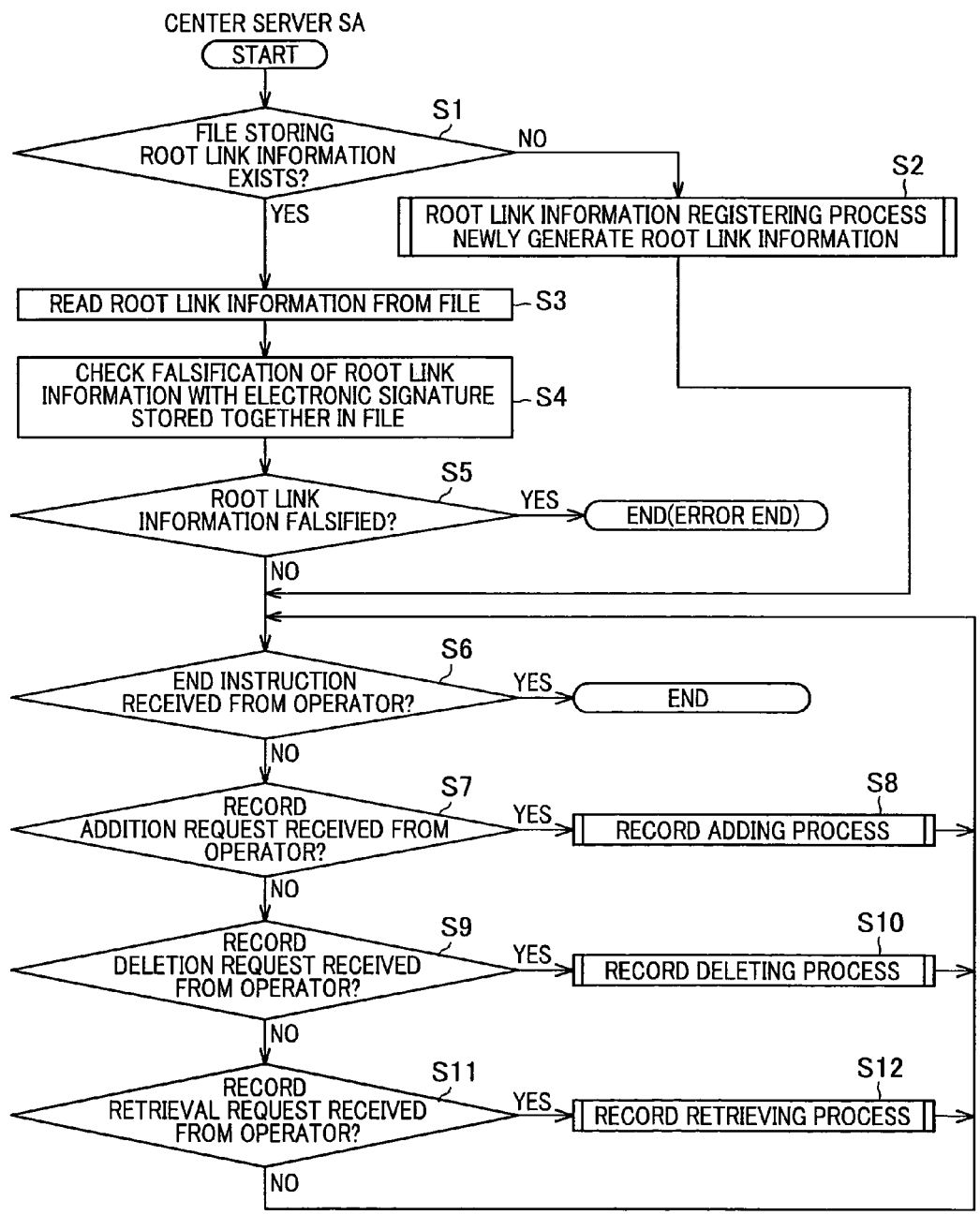
FIG. 9 is a flowchart showing an example of processes of a control unit 11 in a center server SA according to the embodiment.

For example, when the database management program is started, the processes shown in FIG. 9 are started. First, the control unit 11 executes an initializing process in steps S1 to S5. Concretely, the control unit 11 determines whether a file storing root link information is stored in the storage unit 12 or not (step S1). In the case where the database management program is started for the first time, the root link information is not generated yet by the control unit 11. On the other hand, in the case where start of the database management program is not the first, the root link information is already generated and stored in a file. In the case where the file storing the root link information is not stored in the storage unit 12 (NO in step S1), the control unit 11 executes a root link information registering process (step S2). In the root link information registering process executed from the initializing process, root link information and root page information is newly generated by the control unit 11. The details of the root link information registering process will be described later.

In step S1, in the case where the file storing the root link information is stored in the storage unit 12 (YES in step S1), the control unit 11 reads the root link information from the file and stores it in the RAM (step S3).

Next, the control unit 11 checks falsification of the root link information by using an electronic signature stored in the file (step S4). For example, the control unit 11 calculates a message digest from the root link information, more concretely, a serial number and a message digest in the root page information. For calculation of the message digest, a hash function which is set in the electronic signature is used. The control unit 11 decodes the signature value of the electronic signature by using a public key which is set in certificate information of the electronic signature. The control unit 11 determines whether the generated message digest and the decoded data match or not. In the case where they match, it is regarded that the root link information is not falsified. In the case where they do not match, the root link information is falsified.

Subsequently, the control unit 11 determines whether the root link information is falsified or not (step S5). In the case where the root link information is falsified (YES in step S5), the control unit 11 finishes the process due to an error. In this case, for example, an error indicating that the root link information is falsified is displayed on the display unit 14, and execution of the database management program is interrupted.

In step S5, in the case where the root link information is not falsified (NO in step S5) or in the case where the root link information registering process in step S2 is finished, the control unit 11 starts the main process.

First, the control unit 11 determines whether an end instruction is given from an operator or not on the basis of an input from the input unit 15 (step S6).

In the case where there is no end instruction (NO in step S6), the control unit 11 determines whether there is a record addition request from the operator or not on the basis of the input from the input unit 15 (step S7). In the case where there is a record addition request (YES in step S7), the control unit 11 executes a record adding process (step S8). In this case, the control unit 11 designates, for example, a new record which is input from the input unit 15 by an operator operation. In the case where a search key is necessary separately, the control unit 11 also designates a search key for a new record. In the record adding process, the input new record is added to the catalog information. The details of the record adding process will be described later.

In the case where there is no record addition request (NO in step S7), the control unit 11 determines whether there is a record deletion request from an operator or not on the basis of an input from the input unit 15 (step S9). In the case where there is a record deletion request (YES in step S9), the control unit 11 executes a record deleting process (step S10). In this case, the control unit 11 designates a search key for a record to be deleted which is input from the input unit 15 by an operator's operation. In the record deleting process, the record to be deleted corresponding to the designated search key is deleted from catalog information. The details of the record deleting process will be described later.

In step S9, in the case where there is no record deletion request (NO in step S9), the control unit 11 determines whether there is a record retrieval request from the operator or not on the basis of an input from the input unit 15 (step S11). In the case where there is a record retrieval request (YES in step S11), the control unit 11 executes the record retrieving process (step S12). In this case, the control unit 11 designates a search key input from the input unit 15 by an operator's operation. In the record retrieving process, a record corresponding to the designated search key is retrieved from the catalog information. The details of the record retrieving process will be described later.

When the process of step S8, S10, or S12 is finished or when there is no record retrieval request in step S11 (NO in step S11), the control unit 11 moves to step S6. In the case where there is an end instruction from the operator in step S6 (YES in step S6), the control unit 11 finishes the process.

Figure 10:
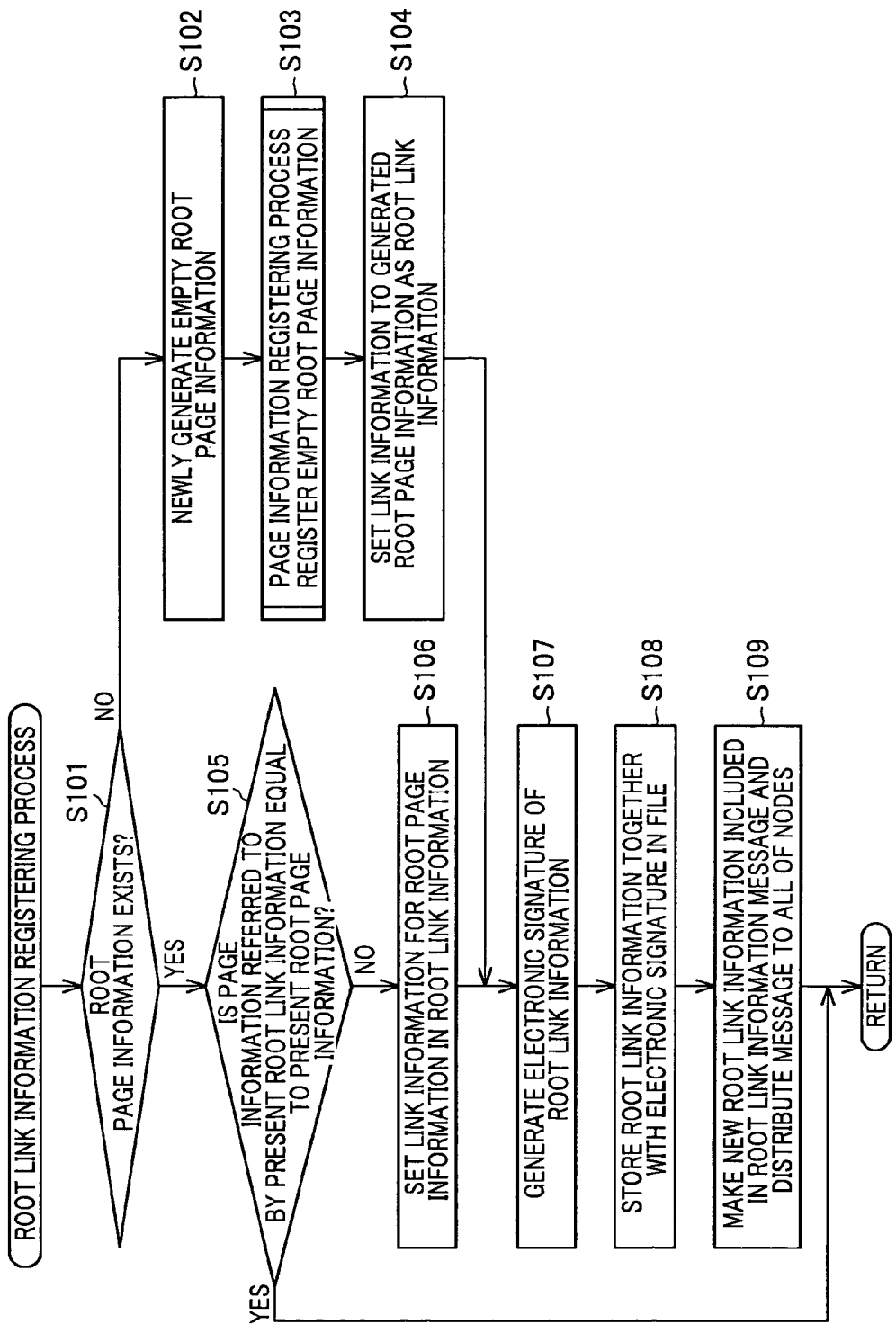
FIG. 10 is a flowchart showing a process example of route link information registering process of the control unit 11 in the center server SA according to the embodiment.

First, as shown in FIG. 10, the control unit 11 determines whether there is root page information or not (step S101). That is, the control unit 11 determines whether the root page information is stored in the RAM or not. In the case where the root link information registering process is executed from the initializing process or in the case where the root page information is deleted from the RAM by the record deleting process, the root page information does not exist. Consequently, when there is no root page information (NO in step S101), the control unit 11 newly generates empty root page information and stores it in the RAM (step S102).

Subsequently, the control unit 11 executes a page information registering process (step S103). The control unit 11 designates the newly generated root page information. In the page information registering process, information of a link to the designated page information is generated, and the page information is stored in a file. In such a manner, the root page information is registered. The details of the page information registering process will be described later.

Next, the control unit 11 as the root link information generating device sets the generated link information in the root link information (step S104).

In step S101, in the case where the root page information exists (YES in step S101), the control unit 11 determines whether page information indicated by present root link information matches the present root page information or not (step S105). In the record adding process or the record deleting process, in place of old page information indicated by the present root link information, new root page information is generated. In the case where the page information indicated by the present root link information does not match the present root page information (NO in step S105), the control unit 11 as a root link information generating device sets the information of a link to the root page information in the root link information (step S106).

After completion of the process of step S104 or S106, the control unit 11 as a root link information generating device generates an electronic signature of the root link information (step S107). For example, the control unit 11 generates a message digest from the root link information, more concretely, the page number and the message digest of the root page information. Subsequently, the control unit 11 enciphers the generated message digest using a secret key, thereby obtaining a signature value. The control unit 11 generates an electronic signature by setting information such as the hash function used for calculation of the message digest, the signature value, and certification information.

Subsequently, the control unit 11 stores the root link information together with the generated electronic signature in a file (step S108).

The control unit 11 makes the generated new root link information included in a root link information message and distributes the root link information message to all of the nodes Nn (step S109). The distribution may be performed by, for example, overlay multicast. In the case where the page information indicated by the present root link information matches the present root page information in step S105 or when the process in step S109 is finished, the control unit 11 finishes the root link information registering process.

Figure 11:
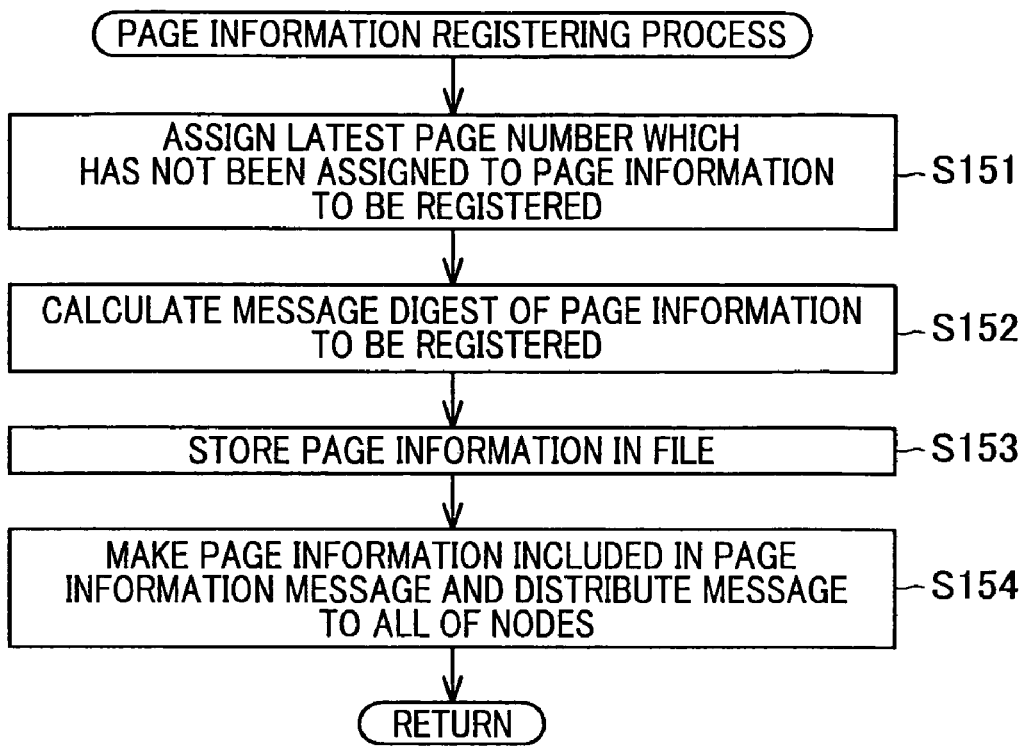
FIG. 11 is a flowchart showing a process example of page information registering process of the control unit 11 in the center server SA according to the embodiment.

First, as shown in FIG. 11, the control unit 11 as an assigning device assigns the latest page number which has not been assigned to page information designated as page information to be registered (step S151). Next, the control unit 11 calculates the message digest of the page information to be registered (step S152).

Subsequently, the control unit 11 stores the page information to be registered into a file (step S153). At this time, a page number is given to, for example, a file name so that the location of the page information can be specified.

The control unit 11 makes the generated new page information included in the page information message and distributes the page information message to all of the nodes Nn (step S154). The distribution may be performed by, for example, overlay multicast.

After completion of the process, the control unit 11 finishes the page information registering process and returns link information made by the assigned page number and the calculated message digest to a process of a calling side.

Figure 12:
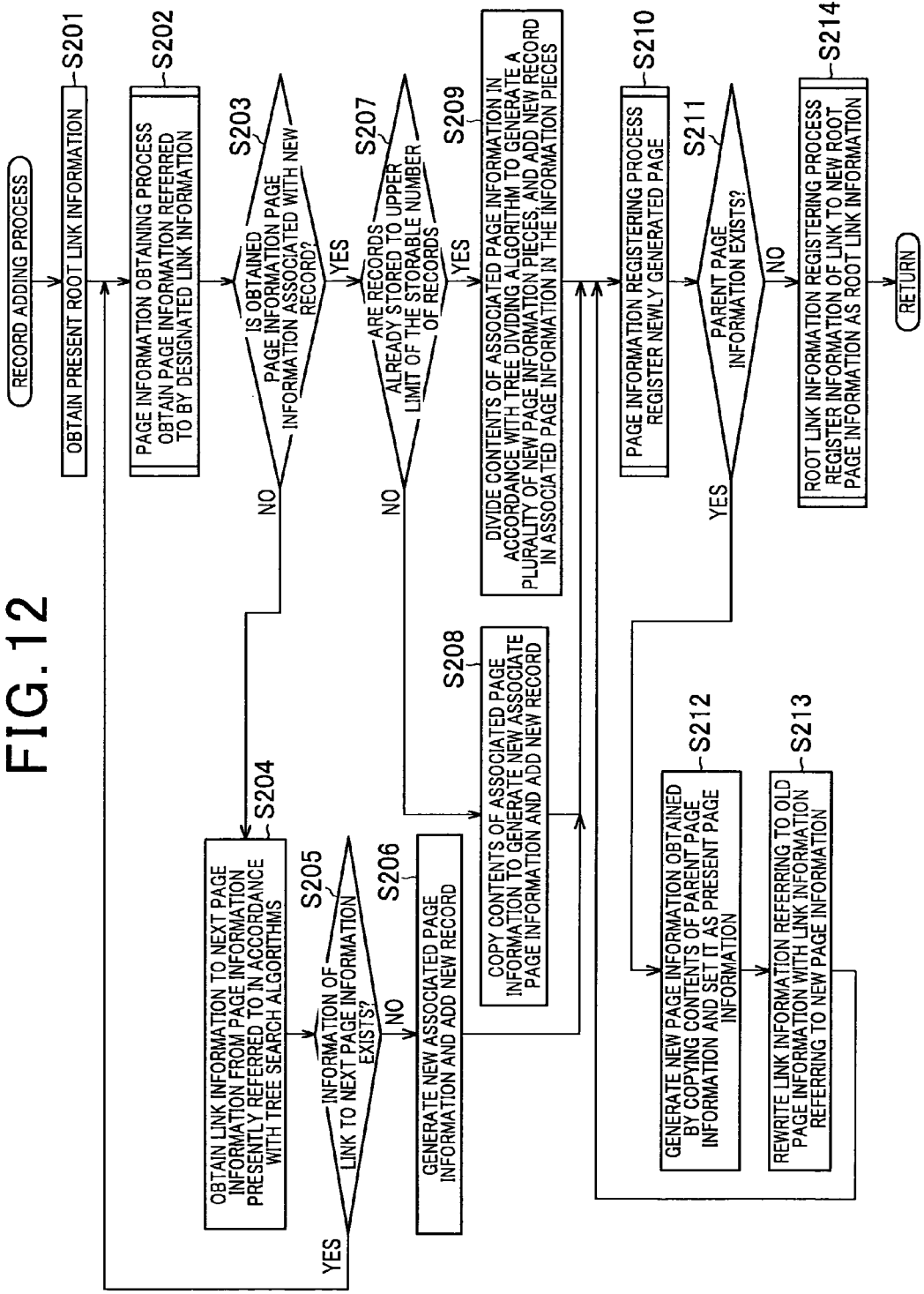
FIG. 12 is a flowchart showing a process example of record adding process of the control unit 11 in the center server SA according to the embodiment.

First, as shown in FIG. 12, the control unit 11 obtains the present root link information from the RAM (step S201). Next, the control unit 11 executes a page information obtaining process (step S202). At this time, the control unit 11 designates the root link information. In the page information obtaining process, page information indicated by the designated link information is obtained from the file and stored into the RAM. The obtained page information is regarded as the page information which is presently referred to. The details of the page information obtaining process will be described later.

Subsequently, the control unit 11 as an addition leaf page determining device determines associated page information on the basis of a designated search key and an index which is set in the page information which is presently referred to. The associated page information denotes page information to which a certain record is to be stored. In the case of adding a record, leaf page information to which an input new record is to be stored is associated page information.

Concretely, the control unit 11 determines whether obtained page information is associated page information for a new record or not (step S203). The determining method depends on the structure of the page information.

In the case where the obtained page information is not associated page information of a new record (NO in step S203), the control unit 11 obtains information of a link to the next page information from the page information which is presently referred to (step 204). The next page information means page information to be referred to next among child page information of the page information which is presently referred to. The page information to be referred to next corresponds to a designated search key. The process is performed in accordance with a search algorithm corresponding to the structure of the search tree of the catalog information. For example, the control unit 11 specifies information of a link to the next page information by comparing the designated search key with the index which is set in the page information which is presently referred to. Concretely, in the embodiment, the search key and the index are compared to see which is larger. As a result of the comparison, for example, according to the case where the value of the search key is equal to or less than the value of the index or the case where the value of the search key is large than the value of the index, the information of a link to the next page information is specified.

Subsequently, the control unit 11 determines whether the information of a link to the next page information exists or not (step S205). That is, the control unit 11 determines whether the information of a link to the next page information can be obtained or not. In the case where there is no information of a link to the next page information (NO in step S205), the control unit 11 as a leaf page information generating device generates new associated page information and stores it on the RAM in step S206. The control unit 11 as a registering device adds and sets a new record to the generated associated page information. As necessary from the viewpoint of structure of the catalog information, the control unit 11 adds a search key of a new record as an index to the associated page information in correspondence with the new record. For example, when leaf page information becomes empty when a record is deleted in a record deleting process which will be described later, the leaf page information which became empty is deleted. In this case, in parent page information of the leaf page information which became empty, an invalid value is set in link information referring to the leaf page information by the control unit 11. By the operation, the link information referring to the leaf page information which became empty is deleted. However, in the case where an index which is stored in the parent page information is not updated, there is a case that invalid link information is specified according to the comparison between the search key and the index. That is, in step S205, it is determined that information of a link to next page information does not exist. In this case, the next page information, that is, associated page information that stores a new record in correspondence with the search key is necessary, so that the associated page information is generated in step S206.

On the other hand, when link information to the next page information exists (YES in step S205), the control unit 11 moves to step S202. The control unit 11 designates the obtained link information and executes the page information obtaining process.

In the case where the obtained page information is associated page information of a new record (YES in step S203), the control unit 11 as a determining device determines whether a new record can be added to the determined associated page information or not. Concretely, the control unit 11 determines whether or not records are already stored to the upper limit of the number of records which can be stored in the associated page information (step S207). In the case where records are not stored up to the upper limit of the number of records which can be stored (YES in step S207), in step S208, the control unit 11 as a leaf page information generating device generates new associated page information obtained by copying the contents of the present associated page information and stores it on the RAM. The control unit 11 as a registering device adds a new record to new associated page information and sets it. As necessary, like in step S206, the control unit 11 adds a search key of a new record as an index.

On the other hand, in the case where records are already stored to the upper limit of the number of records which can be stored (NO in step S207), the control unit 11 as a leaf page information generating device divides page information in step S209. Concretely, according to a division algorithm corresponding to the structure of a search tree of catalog information, the control unit 11 divides the contents of the present associated page information to generate a plurality of pieces of new page information, and stores them on the RAM. The control unit 11 as a registering device adds a new record to the associated page information in the new page information. For example, in the case where the control unit 11 divides the contents of the associated page information into three parts, a record stored in the original associated page information is divided into a record of a first part, a record of an intermediate part, and a record of a latter part in accordance with the indexes. For example, it is assumed that six records whose index values are 1, 2, 3, 4, 5, and 6 are stored in the original associated page information. In the case of uniformly dividing the records into three parts, the records whose index values are 1 and 2 are records in the first part. The records whose index values are 3 and 4 are records in the intermediate part. The records whose index values are 5 and 6 are records in the latter part. Page information pieces that store the records are generated. Page information to which a new record is stored is determined on the basis of the search key. The control unit 11 adds the search key of the new record as an index as necessary like in step S206.

The control unit 11 generates a new associated page in steps S206, S208, and S209 and, after that, executes a page information registering process (step S210). At this time, the control unit 11 designates the newly generated page information. In the page information registering process, the link information to the designated page information is generated, and the page information is stored in a file. By the operation, the page information is registered. In the case where the associated page information is divided into a plurality of new page information pieces in step S209, the page information registering process is executed on each of the plurality of page information pieces.

Subsequently, the control unit 11 determines whether parent page information of the registered page information exists or not (step S211). For example, each time link information to the next page information exists in the determination of step S205, the control unit 11 may store the page number of page information which is referred to in a predetermined region in the RAM. By referring to the predetermined region, whether parent page information exits or not and the page number of the parent page information can be specified.

In the case where the parent page information exists (YES in step S211), the control unit 11 as an addition updating device updates the page number and the message digest of each of node page information existing from the parent page information of the leaf page information newly generated to the root page information. Concretely, the control unit 11 as a root page information generating device and a node page information generating device generates a message digest of child page information and parent page information in which link information including the page number of the child page information is stored. More specifically, the control unit 11 generates new parent page information obtained by copying the contents of original parent page information on the RAM (step S212). The control unit 11 sets the new parent page as page information which is presently referred to.

Subsequently, the control unit 11 rewrites the link information referring to the old child page information stored in the page information which is presently referred to with link information indicative of the new child page information (step S213). Concretely, the control unit 11 sets the link information generated in the page information registering process in step S210 as link information referring to new child page information. The control unit 11 overwrites the link information referring to the old child page with the link information referring to the new child page information.

The control unit 11 moves to step S210. The control unit 11 designates the newly generated page information which is presently referred to and executes the page information registering process. By the process, the page information which is presently referred to is registered.

In step S211, in the case where parent page information of the registered page information does not exist, that is, when the registered page information is root page information (step S211), the control unit 11 executes the root link information registering process (step S214). In the root link information registering process, the root link information referring to registered new root page information is generated. On completion of the root link information registering process, the control unit 11 finishes the record adding process.

Figure 13:
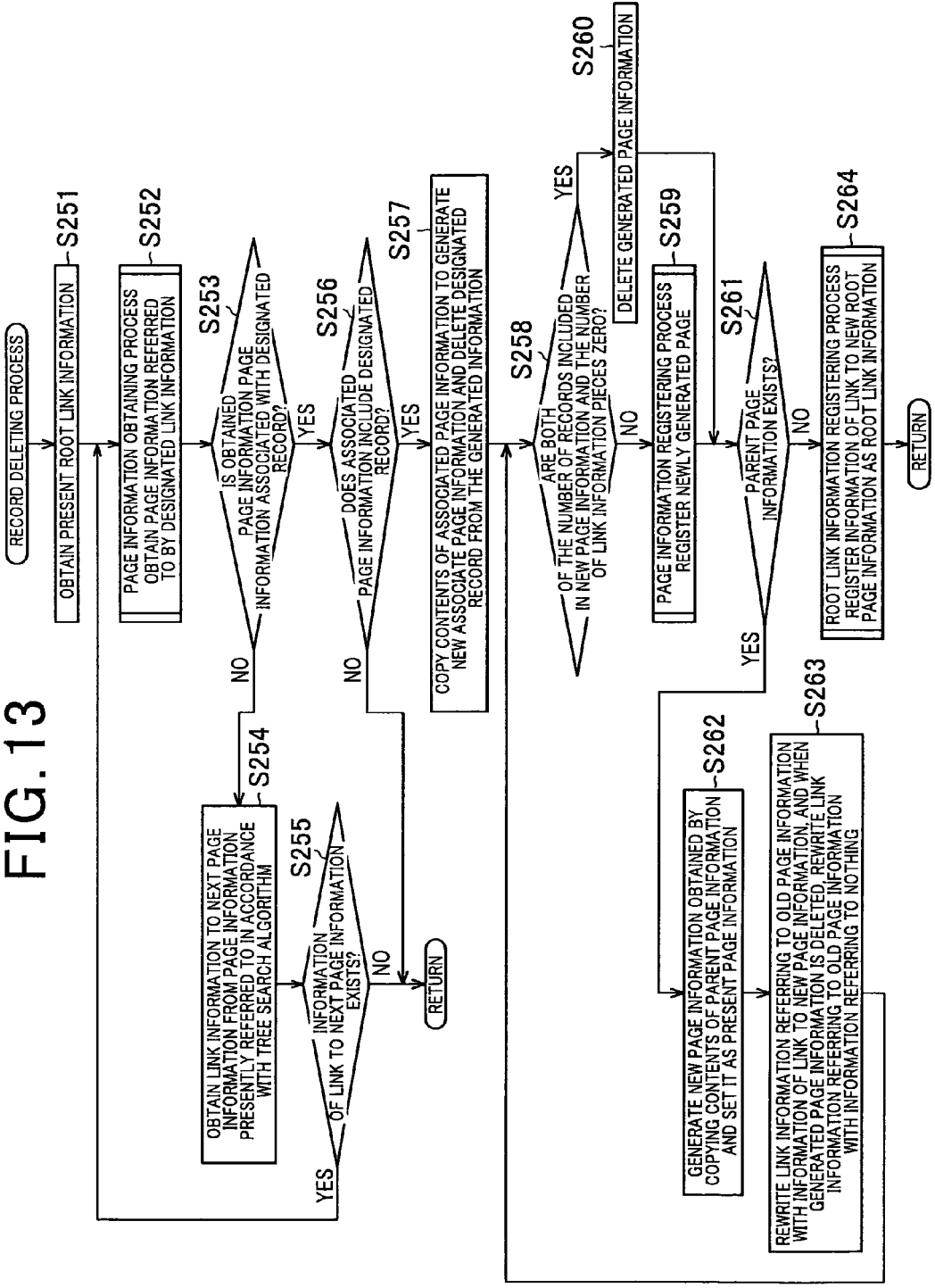
FIG. 13 is a flowchart showing a process example of record deleting process of the control unit 11 in the center server SA according to the embodiment.

First, as shown in FIG. 13, the control unit 11 executes the processes in steps S251 to S255. Those processes are similar to those in steps S201 to S205 in the record adding process. That is, the control unit 11 obtains present root link information from the RAM (step S251). Subsequently, the control unit 11 executes the page information obtaining process (step S252). The control unit 11 as a deletion leaf page determining device determines associated page information on the basis of the designated search key and the index which is set in the node page information. Concretely, the control unit 11 determines whether or not obtained page information is page information associated with a record to be deleted corresponding to the designated search key (step S253). In the case where the obtained page information is not page information associated with the record to be deleted (NO in step S253), the control unit 11 obtains information of a link to the next page information from the page information which is presently referred to (step S254). Subsequently, the control unit 11 determines whether information of a link to the next page information exists or not (step S255). In the case where information of a link to the next page information does not exist (NO in step S255), the control unit 11 finishes the record adding process. That is, since no page information storing a record to be deleted exists, the record adding process is finished here.

In the case where obtained page information is page information associated with a record to be deleted (YES in step S253), the control unit 11 determines whether the associated page information stores a record to be deleted or not (step S256). The determining method depends on the structure of catalog information. For example, in the case of the structure in which a record and an index of the record are associated with each other and stored in page information, the index included in the associated page information is retrieved with the designated search key. In the case where an index matching the designated search key exists, it is determined that a record to be deleted is stored. On the other hand, in the case where an index matching the designated search key does not exist, it is determined that a record to be deleted is not stored. When the record to be deleted is not included in the associated page information (NO in step S256), the control unit 11 finishes the record deleting process.

On the other hand, in the case where a record to be deleted is included in the associated page information (YES in step S256), the control unit 11 as a leaf page information generating device generates leaf page information including one or more records. Concretely, the control unit 11 generates new associated page information obtained by copying the contents of the present associated page information and stores it on the RAM. The control unit 11 deletes a record to be deleted from the new associated page information. In the case where an index of the record to be deleted is set in the associated page information, the control unit 11 also deletes the index.

Next, the control unit 11 determines whether both of the number of records stored in the generated new page information and the number of pieces of link information become zero or not (step S258). That is, the control unit 11 determines whether the generated new page information does not include the numbers or not. In the case where the generated new page information includes the numbers (NO in step S258), the control unit 11 designates the page information and executes the page information registering process (step S259). By the process, new page information from which the record to be deleted was deleted is registered.

On the other hand, in the case where the generated new page information does not include the numbers (YES in step S258), the control unit 11 deletes page information determined as empty information in step S258 from the RAM (step S260).

When the process in step S259 or S260 is finished, the control unit 11 executes the processes in steps S261 to S264. Those processes are basically similar to those in steps S211 to S214 in the record adding process.

That is, the control unit 11 determines whether or not parent page information of the page information registered in step S259 or the page information deleted in step S260 exists (step S261). In the case where parent page information exists (YES in step S261), the control unit 11 as a deletion updating device updates the page number and the message digest of each of node page information from the parent page information of newly generated leaf page information to the root page information. Concretely, the control unit 11 as a root page information generating device and a node page information generating device generates parent page information in which link information including a message digest of child page information and a page number of the child page information is stored. More specifically, the control unit 11 generates new parent page information obtained by copying the contents of original parent page information on the RAM (step S262). The control unit 11 sets the new parent page as page information which is presently referred to.

Subsequently, the control unit 11 rewrites the link information referring to the old child page information stored in the page information which is presently referred to with link information indicative of the new child page information (step S263). In the case where child page information is deleted in step S260, the control unit 11 rewrites the link information referring to the old child page to link information referring to nothing. For example, an invalid value is set as the page number and the message digest. Subsequently, the control unit 11 moves to step S261. In step S261, in the case where parent page information of the registered page information does not exist (NO in step S261), the control unit 11 executes the root link information registering process (step S264). On completion of the root link information registering process, the control unit 11 finishes the record deleting process.

Figure 14:
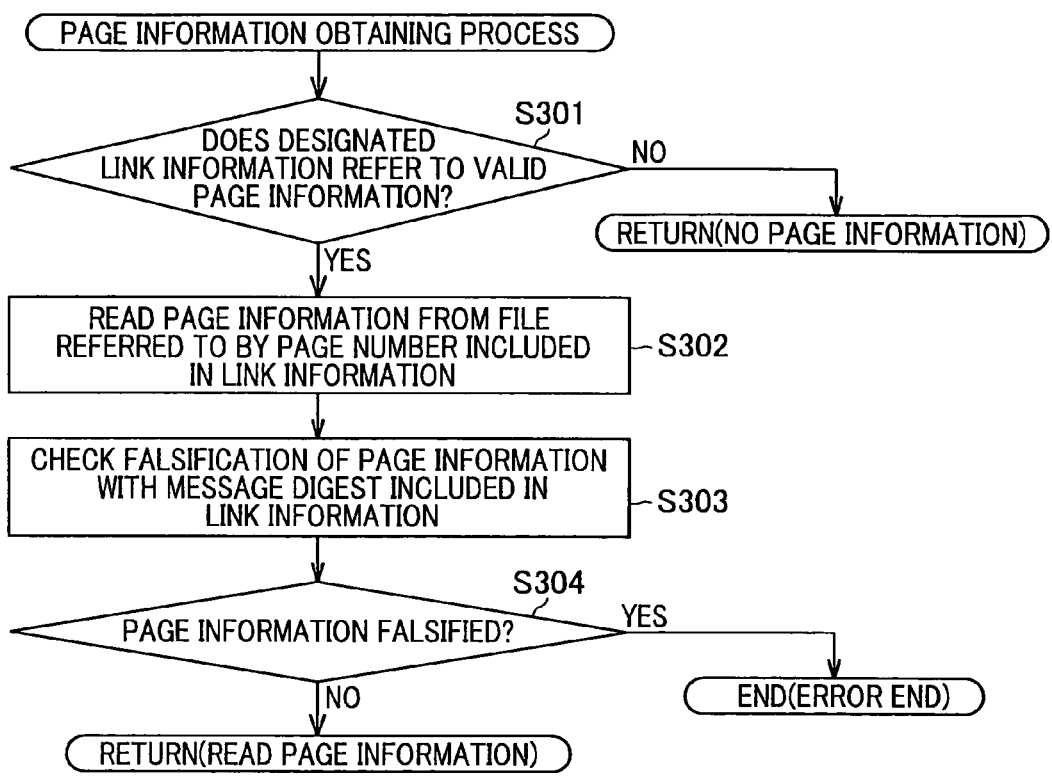
FIG. 14 is a flowchart showing a process example of page information obtaining process of the control unit 11 in the center server SA according to the embodiment.

First, as shown in FIG. 14, the control unit 11 determines whether designated link information refers to valid page information or not (step S301). For example, in the case where the page number of link information is set to an invalid value, the link information does not refer to valid page information. For example, in the case where the page number is determined so as to start from 1, link information in which the value of 1 or more is set as the page number is valid, and link information in which 0 is set as the page number is invalid. In the case where the designated link information does not refer to valid page information (NO in step S301), the control unit 11 finishes the page information obtaining process. In this case, information of "no page information" is returned to the process on the calling side.

On the other hand, in the case where designated link information refers to valid page information (YES in step S301), the control unit 11 reads page information from a file indicated by the page number included in the link information and stores it into the RAM (step S302).

Subsequently, the control unit 11 checks falsification of the read page information by using a message digest included in the designated link information (step S303). Concretely, the control unit 11 calculates a message digest of the read page information. For calculation of the message digest, a hash function which is the same as that used in calculation of a message digest in the page information registering process is used. The control unit 11 determines whether the calculated message digest and the message digest included in the designated link information coincide with each other or not. In the case where they match, the control unit 11 determines that the root link information is not falsified. In the case where they do not match, the control unit 11 determines that the root link information is falsified.

Subsequently, the control unit 11 determines whether the read root page information is falsified or not (step S304). In the case where the page information is falsified (YES in step S304), the control unit 11 finishes the process due to an error. In this case, for example, an error indicating that the page information is falsified is displayed on the display unit 14, and execution of the database management program is interrupted.

On the other hand, in the case where the page information is not falsified (NO in step S304), the control unit 11 returns the read page information to the process on the calling side, and finishes the page information obtaining process.

Figure 15:
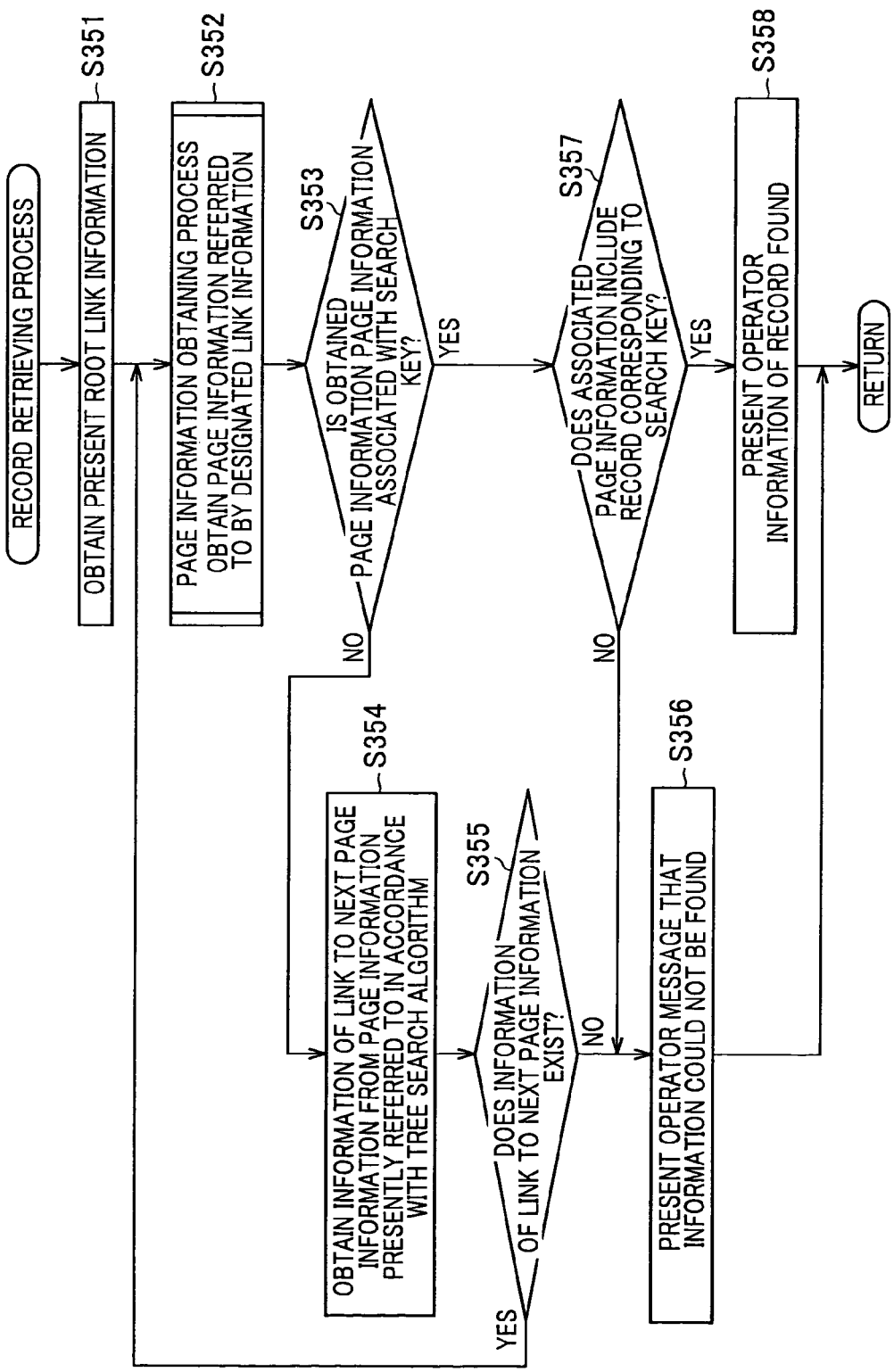
FIG. 15 is a flowchart showing a process example of record retrieving process of the control unit 11 in the center server SA according to the embodiment.

First, as shown in FIG. 15, the control unit 11 executes processes in steps S351 to S355. Those processes are similar to those of steps S201 to S205 in the record adding process. That is, the control unit 11 obtains present root link information from the RAM (step S351). Subsequently, the control unit 11 executes the page information obtaining process (step S352). The control unit 11 as a retrieving device determines associated page information on the basis of a designated search key and an index set in the node page information. Concretely, the control unit 11 determines whether the obtained page information is page information associated with a record corresponding to the designated search key (S353). In the case where the obtained page information is not associated page information of a record to be deleted (NO in step S353), the control unit 11 obtains information of a link to the next page information from the page information which is presently referred to (step 354). Subsequently, the control unit 11 determines whether the information of a link to the next page information exists or not (step S355). In the case where there is no information of a link to the next page information (NO in step S355), the control unit 11 presents the operator that no record corresponding to the designated search key was found (step S356). For example, a message of no finding is displayed on the display unit 14.

In the case where obtained page information is page information associated with a record corresponding to the search key (YES in step S353), the control unit 11 determines that the associated page information includes a record corresponding to the search key (step S357). In the case where the associated page information does not include the record corresponding to the search key (NO in step S357), the control unit 11 presents the operator the fact that a record corresponding to the designated search key is not found (step S356). On the other hand, in the case where the associated page information includes a record corresponding to the search key, the control unit 11 presents the operator the information of the found record. For example, the contents of the record are displayed on the display unit 14. After completion of the process in step S356 or S358, the control unit 11 finishes the record retrieving process.

6.2 Operation of Node Nn

Figure 16:
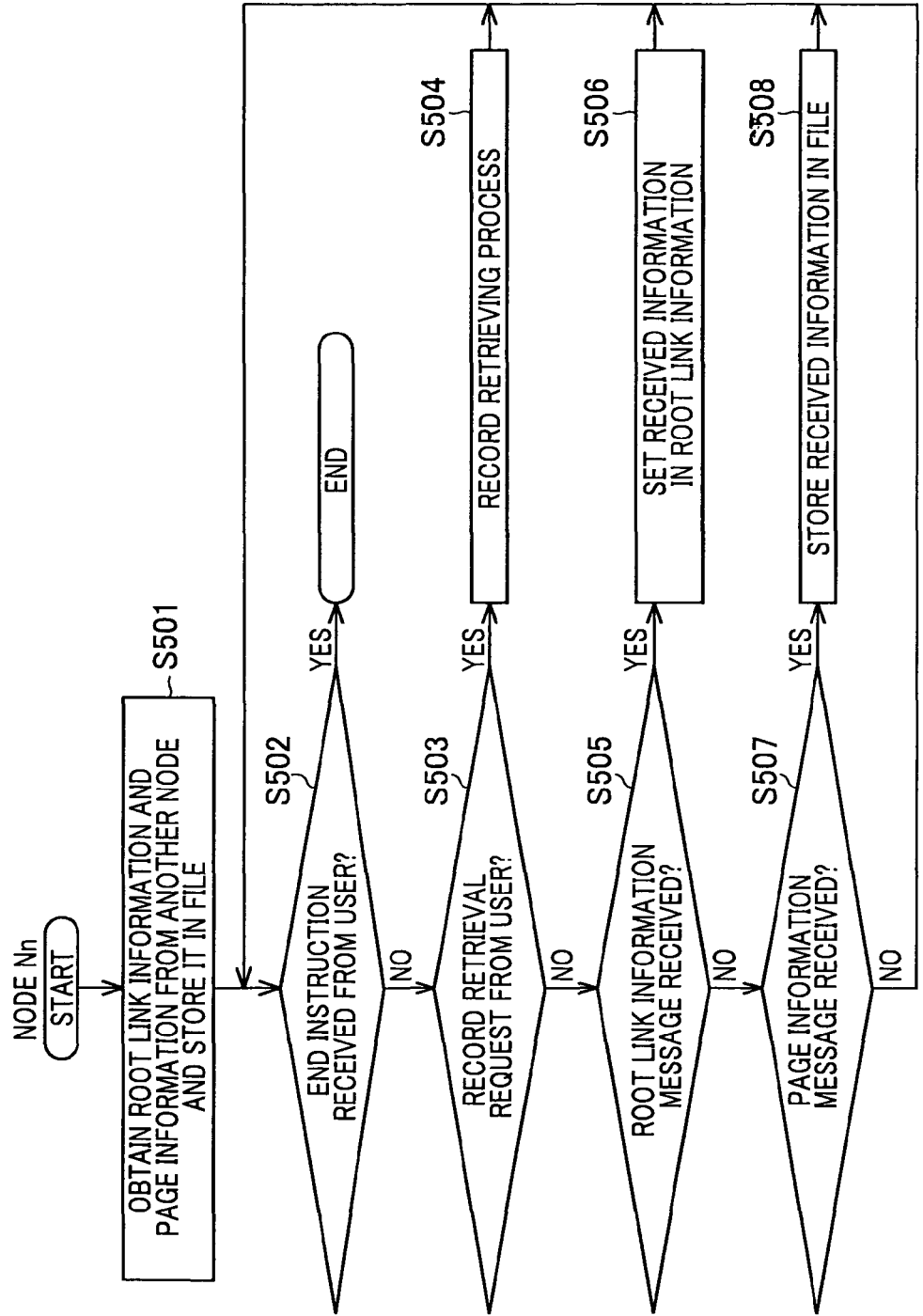
FIG. 16 is a flowchart showing a process example of a control unit 21 in a node Nn according to an embodiment.

The process shown in FIG. 16 is started, for example, when the node Nn participates in the content disperse storage system S. First, the control unit 21 obtains the latest root link information and page information from another node Nn participating in the content disperse storage system S (step S501). For example, by sending a message to the node Nn as a request destination, the control unit 21 receives root link information and page information sent from the node Nn as the request destination. The control unit 21 stores the root link information in the RAM and stores the page information in a file.

Subsequently, the control unit 21 determines whether there is an end instruction from the user or not on the basis of an input from the input unit 30 (step S502).

In the case where there is no end instruction (NO in step S502), the control unit 21 determines whether there is a record retrieval request from the user or not on the basis of an input from the input unit 30 (step S503). When there is a record retrieval request (YES in step S503), the control unit 21 executes a record retrieving process (step S504). In the record retrieving process, a record corresponding to a search key designated by the user is retrieved from catalog information. Since the contents of the record retrieving process is similar to that of the record retrieving process in the center server SA, the detailed description will not be repeated.

When there is no record retrieval request (NO in step S503), the control unit 21 determines whether a root link information message is received or not (step S505). When the root link information message is received (YES in step S505), the control unit 21 sets information included in the root link information message as root link information in the RAM (step S506).

When the root link information message is not received (NO in step S505), the control unit 21 determines whether a page information message is received or not (step S507). When the page information message is received (YES in step S507), the control unit 21 stores information included in the page information message as page information into a file (step S508).

When the process in step S504, S506, or S508 is finished or when the page information message is not received in step S507 (NO in step S507), the control unit 21 moves to step S502. When there is an end instruction from the user (YES in step S502), the control unit 21 finishes the process.

As described above, according to the embodiment, the control unit 11 generates leaf page information including one or more records. The control unit 11 generates root page information having a message digest of child page information of the root page information and link information including the page number of the child page information. The control unit 11 generates node page information having a message digest of child page information of node page information other than the root page information and link information including the page number of the child page information. The control unit 11 stores, as a tree structure, the generated leaf page information, root page information, and node page information into the storage unit 12.

Therefore, by managing records in the tree structure, falsification of records can be also checked, and time for the record retrieving process is also shortened.

The control unit 11 also generates root link information having a message digest of root page information, the page number of the root page information, and an electronic signature of root link information. The control unit 11 stores the generated root link information into the storage unit 12.

Therefore, although an electronic signature has to be added to all of records in conventional technologies, by administering an electronic signature only the root link information, falsification of a record in a child position can be checked by recognizing the electronic signature in the root page. Consequently, the data amount of each record is decreased as compared with the case of adding an electronic signature to all of the records. In addition, since the process of adding an electronic signature to all of the records is unnecessary, an electronic signature process is made unnecessary.

In the case where a new record can be added, the control unit 11 generates new leaf page information obtained by adding a new record to the contents of determined associated page information. On the other hand, in the case where a new record cannot be added, the control unit 11 generates new leaf page information, and adds a new record to the new leaf page information. The control unit 11 updates page numbers and message digests of node page information existing from parent page information of the newly generated leaf page information to root page information. In the case where a record to be deleted is included in the determined leaf page information, the control unit 11 generates new leaf page information from which the record to be deleted is deleted. The control unit 11 updates page numbers and message digests of node page information existing from parent page information of the newly generated leaf page information to root page information.

Therefore, a record can be easily added to leaf page information in a tree structure. Even when a new record cannot be added to associated page information, a new record can be added to newly added leaf page information.

In the case where a record to be deleted is included in determined associated page information, the control unit 11 generates new leaf page information from which the record to be deleted is deleted. The control unit 11 updates the page numbers and message digests in node page information existing from parent page information of the newly generated leaf page information to root page information. Therefore, for example, an old record which is desired to be deleted can be eliminated.

The control unit 11 determines associated page information on the basis of a search key input from the input unit 15 and an index which is set in node page information. In the case where a record to be retrieved is included in the determined associated page information, the control unit 11 presents the information of the record to be retrieved to the operator. Therefore, the record to be retrieved can be promptly retrieved.

Although the management apparatus according to the invention is applied to a server device in a peer-to-peer system in the foregoing embodiment, for example, it may be applied to a server in a client-server system.

The present invention is not limited to retrieval of content catalog information, but can be also applied to records and indexes of a general database.

What is claimed is:

1. A management apparatus comprising:
   a page information storing unit configured to store a plurality of pieces of page information as a tree structure so that the plurality of pieces of page information from root page information positioned in a root to leaf page information positioned in a leaf are associated with each other;
   a leaf page information generating unit configured to generate the leaf page information including one or more records;
   a root page information generating unit configured to generate the root page information including falsification check information for checking falsification of child page information in position of a child of the root page information or the record in position of a child of the root page information, and a serial number of the child page information in the position of the child of the root page information;
   a node page information generating unit configured to generate the node page information including falsification check information for checking falsification of child page information in position of a child of the node page information positioned between the root page information and the leaf page information or the record in position of a child of the node page information, and a serial number of the child page information in the position of the child of the node page information,
   wherein the page information storing unit stores the root page information, the node page information, and the leaf page information in the tree structure; and
   a root link information generating unit configured to generate root link information comprised by a serial number of the root page information and falsification check information for checking falsification of the root page information, and an electronic signature for checking falsification of the root link information, wherein the page information storing unit stores the root link information, the root page information, the node page information, and the leaf page information in the tree structure.

2. The management apparatus according to claim 1, wherein the root page information generating unit further generates assigned region information indicative of a region assigned to index information corresponding to one or more page information pieces having a parent-child relation with the root page information as a parent in the tree structure, the node page information generating unit further generates assigned region information indicative of a region assigned to index information corresponding to one or more page information pieces having a parent-child relation with the node page information as a parent in the tree structure, and the apparatus further comprises:

an first input unit configured to input an addition record to be added and index information of the record;

an addition leaf page determining unit configured to determine the leaf page information in which the addition record is to be registered on the basis of index information input by the first input unit, and the assigned region information of the root page information or the node page information;

a registering unit configured to register the addition record to leaf page information determined by the addition leaf page determining unit;

an assigning unit configured to assign a new serial number to the leaf page information determined by the addition leaf page determining unit; and an updating unit configured to update, on the basis of registration of the addition record, the serial number and the falsification check information of the node page information from leaf page information in which the addition record is registered to the root page information, and the root page information.

3. The management apparatus according to claim 2, wherein the addition page determining unit comprises a determining unit configured to determine whether the addition record can be registered in the determined leaf page information, in the case where it is determined by the determining unit that the addition record cannot be registered, the leaf page information generating unit generates new leaf page information, the registering unit registers the addition record in the newly generated leaf page information, the assigning unit assigns a new serial number to the newly generated leaf page information, and the first updating unit updates the serial numbers and the falsification check information of the node page information from the newly generated leaf page information to the root page information, and the root page information, on the basis of registration of the additional record.

4. The management apparatus according to claim 1, wherein the root page information generating unit further generates assigned region information indicative of a region assigned to index information of page information having a parent-child relation with the root page information as a parent in the tree structure, the node page information generating unit further generates assigned region information indicative of a region assigned to index information of page information having a parent-child relation with the node page information as a parent in the tree structure, and the apparatus further comprises:

a second input unit configured to input index information of a record to be deleted;

a deletion leaf page determining unit configured to determine the leaf page information in which the deletion record is to be registered on the basis of index information input by the second input unit, and the assigned region information of the root page information or the node page information; and a second updating unit configuration to update, on the basis of determination of the leaf page information, the serial number and the check information of the node page information from leaf page information determined by the deletion leaf page determining unit to the root page information, and the root page information.

5. The management apparatus according to claim 1, wherein index information for retrieving the record included in the leaf page information is included in the leaf page information, the root page information generating unit is configured to further generate assigned region information indicative of a region assigned to index information of page information having a parent-child relation with the root page as a parent in the tree structure, the node page information generating unit is configured to further generate assigned region information indicative of a region assigned to index information of page information having a parent-child relation with the node page information as a parent in the tree structure, the apparatus further comprises:

a retrieval input unit configured to input index information of a retrieval record to be retrieved; and a retrieving unit configured to retrieve index information of the retrieval record on the basis of the index information input by the retrieval input unit and the assigned region information of the root page information or the node page information.

6. A non-transitory computer-readable recording medium recording an information generating program, the information generating program making a computer perform the steps of:

to manage a plurality of pieces of page information as a tree structure, generating root page information including falsification check information for checking falsification of child page information in position of a child of the root page information positioned at a root in a tree structure or the record in position of a child of the root page information, and a serial number of the child page information in the position of the child of the root page information;

generating the leaf page information including one or more records;

generating the node page information including falsification check information for checking falsification of child page information in position of a child of the node page information positioned between the root page information and the leaf page information in the tree structure or the record in position of a child of the node page information, and a serial number of the child page information in the position of the child of the node page information;

storing, as the plurality of pieces of page information, the root page information, the node page information, and the leaf page information in the tree structure;

generating root link information comprised by a serial number of the root page information and falsification check information for checking falsification of the root page information, and an electronic signature for checking falsification of the root link information; and storing the root link information, the root page information, the node page information, and the leaf page information in the tree structure.

7. An information generating method comprising the steps of:

to manage a plurality of pieces of page information as a tree structure, generating the root page information including falsification check information for checking falsification of child page information in position of a child of the root page information positioned at a root in a tree structure or the record in position of a child of the root page information, and a serial number of the child page information in the position of the child of the root page information;

generating leaf page information including one or more records;

generating the node page information including falsification check information for checking falsification of child page information in position of a child of the node page information positioned between the root page information and the leaf page information in the tree structure or the record in position of a child of the node page information, and a serial number of the child page information in the position of the child of the node page information;

storing, as the plurality of pieces of page information, the root page information, the node page information, and the leaf page information in the tree structure;

generating root link information comprised by a serial number of the root page information and falsification check information for checking falsification of the root page information, and an electronic signature for checking falsification of the root link information; and storing the root link information, the root page information, the node page information, and the leaf page information in the tree structure.

* * * * *